United States Patent
Yang et al.

(10) Patent No.: US 10,415,978 B2
(45) Date of Patent: Sep. 17, 2019

(54) LANDMARK LOCATION DETERMINATION

(71) Applicant: Samsung Electronics Co., Ltd., Suwon-si, Gyeonggi-do (KR)

(72) Inventors: Jun Yang, Milpitas, CA (US); Dongfang Zheng, Santa Clara, CA (US); Jasvinder Singh, San Jose, CA (US); Koichi Mori, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 639 days.

(21) Appl. No.: 14/948,188

(22) Filed: Nov. 20, 2015

(65) Prior Publication Data
US 2017/0146349 A1    May 25, 2017

(51) Int. Cl.
| G01C 21/30 | (2006.01) |
| G01C 21/20 | (2006.01) |
| G01C 21/00 | (2006.01) |
| G01C 21/14 | (2006.01) |
| H04W 4/02 | (2018.01) |
| H04W 4/33 | (2018.01) |

(52) U.S. Cl.
CPC ......... *G01C 21/206* (2013.01); *G01C 21/005* (2013.01); *G01C 21/14* (2013.01); *G01C 21/30* (2013.01); *H04W 4/026* (2013.01); *H04W 4/027* (2013.01); *H04W 4/33* (2018.02)

(58) Field of Classification Search
None
See application file for complete search history.

(56) References Cited

U.S. PATENT DOCUMENTS

| 6,108,597 | A | 8/2000 | Kirchner et al. |
| 8,320,939 | B1 | 11/2012 | Vincent |
| 8,472,980 | B2 | 6/2013 | Khorashadi et al. |
| 8,548,738 | B1 | 10/2013 | Kadous et al. |
| 8,583,400 | B2 | 11/2013 | Thrun et al. |
| 8,626,198 | B2 | 1/2014 | Das et al. |
| 8,896,485 | B2 | 11/2014 | Mendelson |
| 8,942,920 | B1 * | 1/2015 | Davidson ............... G01C 21/32 701/450 |
| 8,965,688 | B2 | 2/2015 | Bandyopadhyay et al. |

(Continued)

FOREIGN PATENT DOCUMENTS

| KR | 10-2006-0131200 | 12/2006 |
| KR | 10-2008-0105160 A | 12/2008 |

(Continued)

OTHER PUBLICATIONS

Le et al., "Indoor Navigation System for Handheld Devices", Worcester Polytechnic Institute, Oct. 22, 2009.

(Continued)

*Primary Examiner* — John Olszewski
*Assistant Examiner* — Gerrad A Foster

(57) ABSTRACT

In one aspect, a method for determining a location of a landmark using a map is described. Trajectory data is obtained indicating movement of a device at an area. The trajectory data indicates a landmark. A map is obtained of the area. At least a portion of the trajectory data is compared and/or matched with at least a portion of the map. Based on the matching, a location of the landmark is determined in the map. Various implementations involve system, devices and software relating to the above method.

21 Claims, 16 Drawing Sheets

(56) References Cited

U.S. PATENT DOCUMENTS

| | | |
|---|---|---|
| 9,014,970 B2 | 4/2015 | Oi et al. |
| 9,052,203 B2 | 6/2015 | Kelly |
| 2007/0198184 A1 | 8/2007 | Yoshioka et al. |
| 2009/0138353 A1 | 5/2009 | Mendelson |
| 2010/0152063 A1 | 6/2010 | Cappuccilli |
| 2010/0198814 A1 | 8/2010 | Petersen et al. |
| 2010/0285817 A1 | 11/2010 | Zhao et al. |
| 2011/0151898 A1 | 6/2011 | Chandra et al. |
| 2011/0208822 A1 | 8/2011 | Rathod |
| 2011/0282581 A1 | 11/2011 | Zeng |
| 2011/0285591 A1 | 11/2011 | Wong |
| 2011/0313779 A1 | 12/2011 | Herzog et al. |
| 2012/0021762 A1 | 1/2012 | Garin et al. |
| 2012/0029817 A1 | 2/2012 | Khorashadi et al. |
| 2012/0099774 A1 | 4/2012 | Akcakaya |
| 2012/0102164 A1 | 4/2012 | Grun et al. |
| 2012/0102165 A1 | 4/2012 | Gruen et al. |
| 2012/0130625 A1 | 5/2012 | Srivastava |
| 2012/0130762 A1 | 5/2012 | Gale et al. |
| 2012/0176491 A1 | 7/2012 | Garin et al. |
| 2012/0182933 A1 | 7/2012 | Bandhakavi et al. |
| 2012/0184292 A1 | 7/2012 | Lin et al. |
| 2012/0185458 A1 | 7/2012 | Liu et al. |
| 2012/0294532 A1 | 11/2012 | Morris |
| 2012/0303556 A1 | 11/2012 | Lin et al. |
| 2013/0079033 A1 | 3/2013 | Gupta et al. |
| 2013/0084882 A1 | 4/2013 | Khorashadi et al. |
| 2013/0084891 A1 | 4/2013 | Khorashadi et al. |
| 2013/0116968 A1 | 5/2013 | Wirola et al. |
| 2013/0122935 A1 | 5/2013 | Das et al. |
| 2013/0151139 A1 | 6/2013 | Park |
| 2013/0166202 A1 | 6/2013 | Bandyopadhyay et al. |
| 2013/0195314 A1 | 8/2013 | Wirola et al. |
| 2013/0201365 A1 | 8/2013 | Wirola et al. |
| 2013/0204652 A1 | 8/2013 | Ritchie et al. |
| 2013/0222369 A1 | 8/2013 | Huston et al. |
| 2013/0023282 A1 | 10/2013 | Lin et al. |
| 2013/0267251 A1 | 10/2013 | Khorashadi et al. |
| 2014/0018095 A1 | 1/2014 | Parvizi et al. |
| 2014/0066103 A1 | 3/2014 | Das et al. |
| 2014/0087707 A1 | 3/2014 | Gustafsson et al. |
| 2014/0119565 A1 | 5/2014 | Kim |
| 2014/0129976 A1 | 5/2014 | Beaurepaire et al. |
| 2014/0141796 A1 | 5/2014 | Marti et al. |
| 2014/0171039 A1 | 6/2014 | Bjontegard |
| 2014/0188537 A1 | 7/2014 | Milbert et al. |
| 2014/0195147 A1 | 7/2014 | Gluek |
| 2014/0222332 A1 | 8/2014 | Lee et al. |
| 2014/0256356 A1 | 9/2014 | Shen et al. |
| 2014/0278060 A1 | 9/2014 | Kordari et al. |
| 2014/0281698 A1 | 9/2014 | Khorashadie et al. |
| 2014/0335893 A1 | 11/2014 | Ronen |
| 2015/0094950 A1* | 4/2015 | Ettinger ............. G01C 21/3476 701/410 |
| 2015/0133148 A1 | 5/2015 | Yang et al. |
| 2015/0204676 A1 | 7/2015 | Zhang et al. |
| 2015/0281910 A1* | 10/2015 | Choudhury ............. G01S 5/021 455/456.1 |
| 2015/0308839 A1 | 10/2015 | Jiang et al. |
| 2015/0309180 A1 | 10/2015 | Jiang et al. |
| 2015/0325000 A1 | 11/2015 | Sripada |
| 2016/0063097 A1 | 4/2016 | Brown |
| 2016/0195400 A1 | 7/2016 | Young et al. |

FOREIGN PATENT DOCUMENTS

| | | |
|---|---|---|
| KR | 10-1017479 B1 | 2/2011 |
| WO | 2009/021068 A1 | 2/2009 |
| WO | 2010/003898 | 1/2010 |
| WO | 2013/071885 A1 | 5/2013 |
| WO | 2013/100287 A1 | 7/2013 |
| WO | 2014/074837 A1 | 5/2014 |
| WO | 2014/172792 | 10/2014 |

OTHER PUBLICATIONS

Pombinho et al., "Indoor Positioning Using a Mobile Phone with an Integrated Accelerometer and Digital Compass", INForum, 2010.

Shala et al., "Indoor Positioning using Sensor-fusion in Android Devices", Department Computer Science Kristianstad University, Sep. 2011.

Xuan et al., "Crowd Sourcing Indoor Maps with Mobile Sensors", University of California, Berkeley, 2012.

Trein et al., "Simple approach for indoor mapping using low-cost accelerometer and gyroscope sensors", University of Toronto Toronto, Canada, 2013.

Radu et al., "HiMLoc: Indoor Smartphone Localization via Activity Aware Pedestrian Dead Reckoning with Selective Crowdsourced WiFi Fingerprinting", 2013 International Conference on Indoor Positioning and Indoor Navigation, Oct. 2013.

Wang et al., "No Need to War-Drive: Unsupervised Indoor Localization", MobiSys'12, Jun. 25-29, 2012.

Ashbrook et al., "Using GPS to Learn Significant Locations and Predict Movement Across Multiple Users", Personal and Ubiquitous Computing, 2003.

Durrant-Whyte et al., *Simultaneous Localization and Mapping: Part I*. IEEE Robotics and Automation Magazine, 2006.

Philipp et al., *Grammar-enhanced Indoor Map Construction from Crowd-Source Data*, ACM MobiCom 2014.

Alzantot et al., *Automatic Construction of Indoor Floorplans*, ACM SIGSPATIAL 2012.

U.S. Appl. No. 14/549,054 filed Nov. 20, 2014.

U.S. Appl. No. 14/881,564 filed Oct. 13, 2015.

International Search Report dated Nov. 30, 2015 from PCT Application No. PCT/KR2015/008764.

Office Action dated May 19, 2016 from U.S. Appl. No. 14/549,054.

Notice of Allowance dated Oct. 5, 2016 from U.S. Appl. No. 14/549,054.

International Search Report dated Sep. 6, 2016 from PCT Application No. PCT/KR2016/005916.

Written Opinion dated Sep. 6, 2016 from PCT Application No. PCT/KR2016/005916.

Supplementary European Search Report dated Oct. 9, 2018 in connection with European Patent Application No. 16 866 514.9, 8 pages.

Office Action dated Apr. 19, 2019 in connection with Korean Patent Application No. 10-2018-7016929, 6 pages. partial English translation).

* cited by examiner

LANDMARK LOCATION DETERMINATION

FIELD OF THE INVENTION

The present invention relates generally to technologies for determining the location of places, objects and areas. Various embodiments of the present invention involve determining the location of a landmark using a map.

BACKGROUND

There are many popular applications that provide maps of outdoor areas. Mapping programs such as Google Maps™ indicate, for example, the location of city streets or buildings. It would also be desirable to have applications for mapping indoor locations e.g., the interior floorplan of a building such as a mall or library. Since there are a huge variety of indoor environments, it would be particularly useful if an accurate map of an indoor area could be automatically generated e.g., based on the movements of mobile devices, which are carried by users who are traversing the area. However, developing such a system is challenging. For example, some approaches involve using a system referred to as Pedestrian Dead Reckoning (PDR). In PDR, a mobile device tracks the distance that a device has traveled and any changes in direction that the device has undertaken. A map can then be created based on the directional and distance changes recorded by the mobile device. However, mobile devices are often not able to perfectly record such changes, which result in errors that grow exponentially over time. Accordingly, there are ongoing efforts to further improve the accuracy of indoor mapping systems.

SUMMARY

In one aspect, a method for determining a location of a landmark using a map is described. Trajectory data is obtained indicating movement of a device at an area. The trajectory data indicates a landmark. A map is obtained of the area. At least a portion of the trajectory data is compared and/or matched with at least a portion of the map. Based on the matching, a location of the landmark is determined in the map. Various implementations involve systems, devices and software relating to the above method.

BRIEF DESCRIPTION OF THE DRAWINGS

The invention and the advantages thereof, may best be understood by reference to the following description taken in conjunction with the accompanying drawings in which.

DETAILED DESCRIPTION

The present invention relates to systems and processes for determining the location of a landmark using a known map. As discussed in the Background, developing an accurate indoor mapping application can be challenging. One approach is to collect trajectory data (e.g., PDR data) from multiple mobile devices that are moving about a particular area (e.g., a mall.) The trajectory data may indicate winding, complicated paths which are caused by the user visiting multiple landmarks (e.g., stores, rooms, etc.) The trajectory data is then analyzed to determine a map, which indicates the location of corridors, hallways, doors, rooms, shops, intersections and other landmarks.

One problem with this approach, however, is that when the entire map and the landmarks are generated at the same time using PDR data, the risk of errors is substantial. It has been determined that it may be advantageous to instead match trajectory data to a known map, and then use the matching to determine the location of a landmark in the context of the known map, without adjusting or determining various other characteristics of the map (e.g., the location of hallways and intersections.) Some of the embodiments described below thus relate to approaches for determining a location of a landmark without adjusting other aspects of a map.

Figure 1:
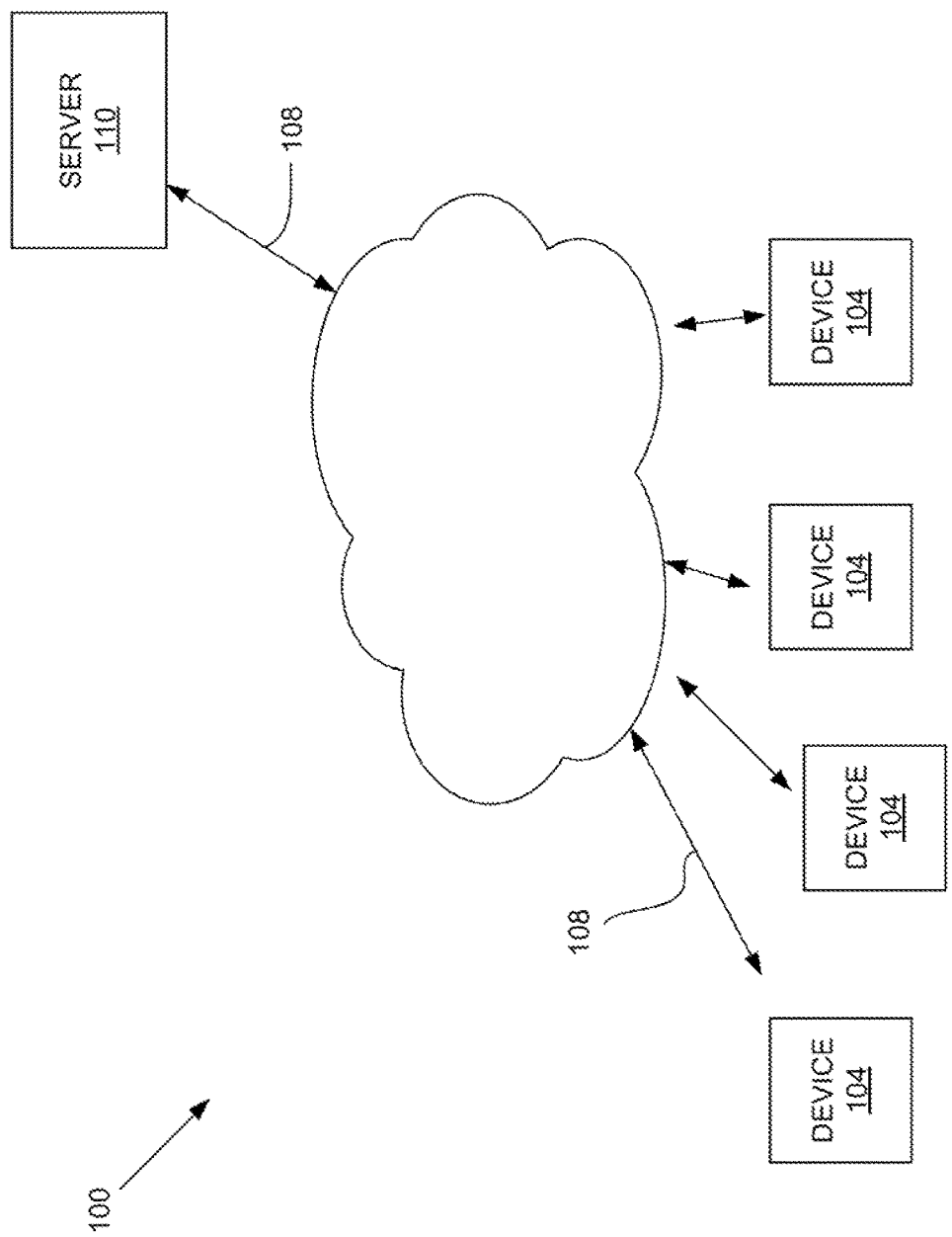
FIG. 1 is a block diagram of a communications system according to a particular embodiment of the present invention.

Referring initially to FIG. 1, a communications system 100 according to a particular embodiment of the present invention will be described. The system includes multiple devices 104 and a server 110. The devices 104 and the server 110 communicate with one another using one or more networks 108.

Any suitable network 108 may be used to connect the devices 104 and the server 110. In various embodiments, the network 108 involves but is not limited to a cellular network based on CDMA or GSM, the Internet or any other suitable protocol or any other communication network.

In this example, a user carries the device 104 into an indoor area, such as a building, a shopping mall, etc. In some embodiments, the area is (partially) outdoors e.g., an outdoor mall complex. As the user's device moves around the area, the device records trajectory data that indicates the directions and distances that the user is moving. The trajectory data also indicates whether the user has spent time in one place over another, or has explored a particular location for a sustained period of time (e.g., a room or a store.)

The trajectory data is uploaded through the network 108 to a server 110. In the illustrated embodiment, the server 110 then analyzes the trajectory data and determines that the user has approached or come into contact with a landmark. A landmark is any object or site of interest in the area. By way of example, a landmark may include but is not necessarily limited to a door, an elevator, an entrance, an exit, a store, a room, a water fountain, stairs, a device, a service provider, etc. In various embodiments, a landmark is understood as being quite different from a path or pathway layout—i.e., it is not a corridor, passage, hallway, route and/or other structure whose primary purpose is to allow a user to move from one place to another place on the same floor.

The server 110 may use a wide variety of processing and analytical techniques to determine the existence and location of a landmark within the trajectory data. For example, any of the techniques discussed in U.S. patent application Ser. No. 14/549,054 may be used. (This application, which is referred to hereinafter as the '054 application, is incorporated herein by reference in its entirety for all purposes.)

In this example, the server 110 also stores a map that includes a pathway layout. The map may be any suitable structure, information, diagram or data that represents the area. The pathway layout indicates routes or paths connected by one or more intersections i.e., areas or points where two or more paths meet. The map may be generated in a wide variety of ways (e.g., using a data structure, algorithmically, using a bitmapped image, etc.), as will be discussed later in the application. In some embodiments, the pathway layout is derived from data crowdsourced over time from multiple mobile devices and users and is thus considered to be relatively accurate.

The server 110 then analyzes the trajectory data and/or the landmark and determines its location in the context of the stored map. A wide variety of matching techniques may be used to determine the location of and/or place the landmark in the map. Some techniques, for example, may be segment-based, sequence-based and/or involve the use of a particle filter. Various techniques will be discussed in greater detail later in the application.

Various approaches improve the efficiency and accuracy of the landmark location determination process. For example, in some implementations, the process used to build the pathway layout of the map is distinct and/or separate from the one used to determine the location of the landmark in the map. Put another way, the aforementioned trajectory data is used to determine the location of a landmark in a known map, and is not used simultaneously to determine the proper locations of paths and routes in the map. Assuming that the known map is reasonably accurate, this focus can allow the location of a landmark to be determined relatively quickly and with less overhead.

Figure 2A:
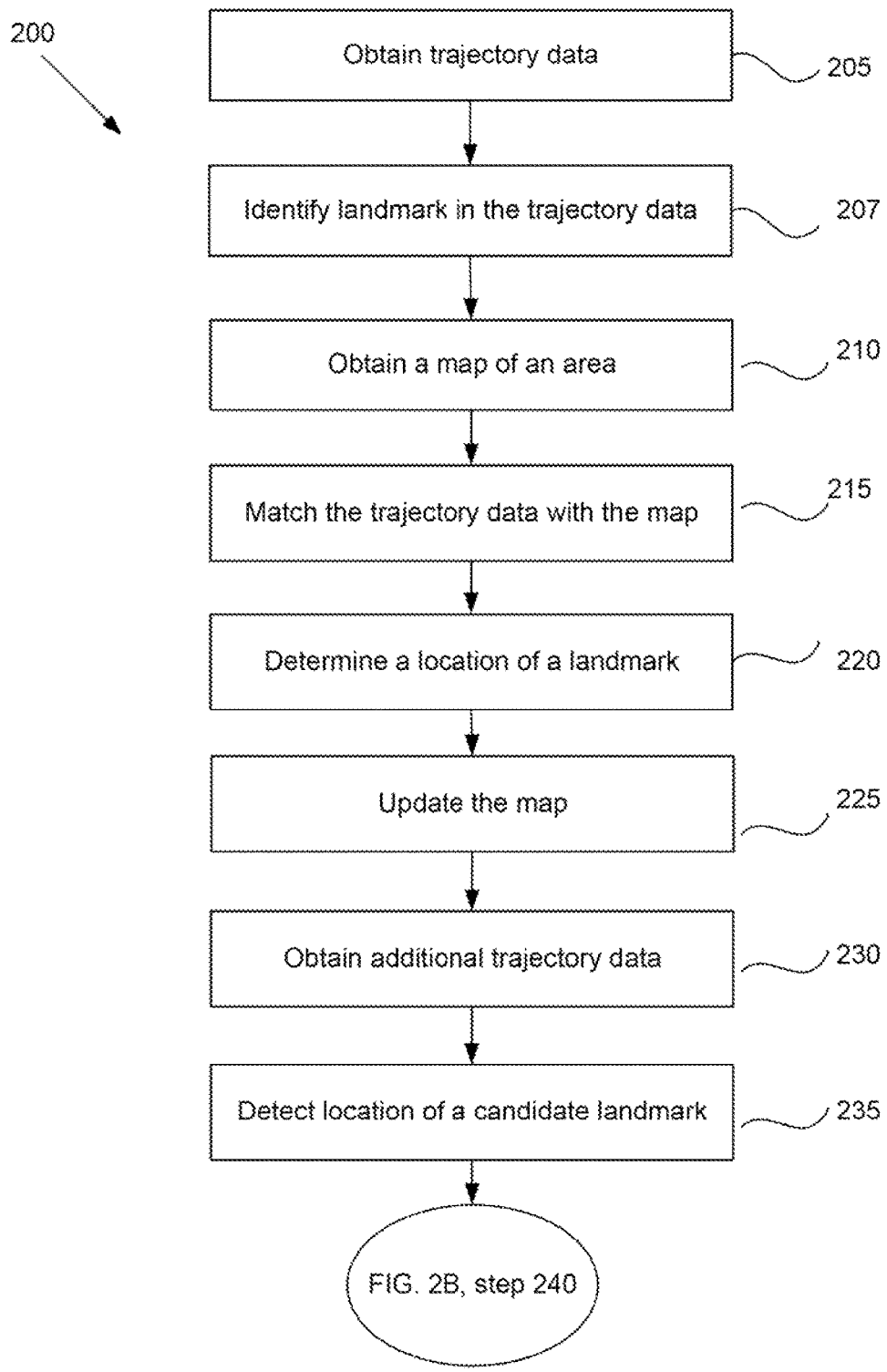
FIGS. 2A-2B are flow diagrams illustrating a method for determining a location of a landmark in a map according to a particular embodiment of the present invention.
Figure 2B:
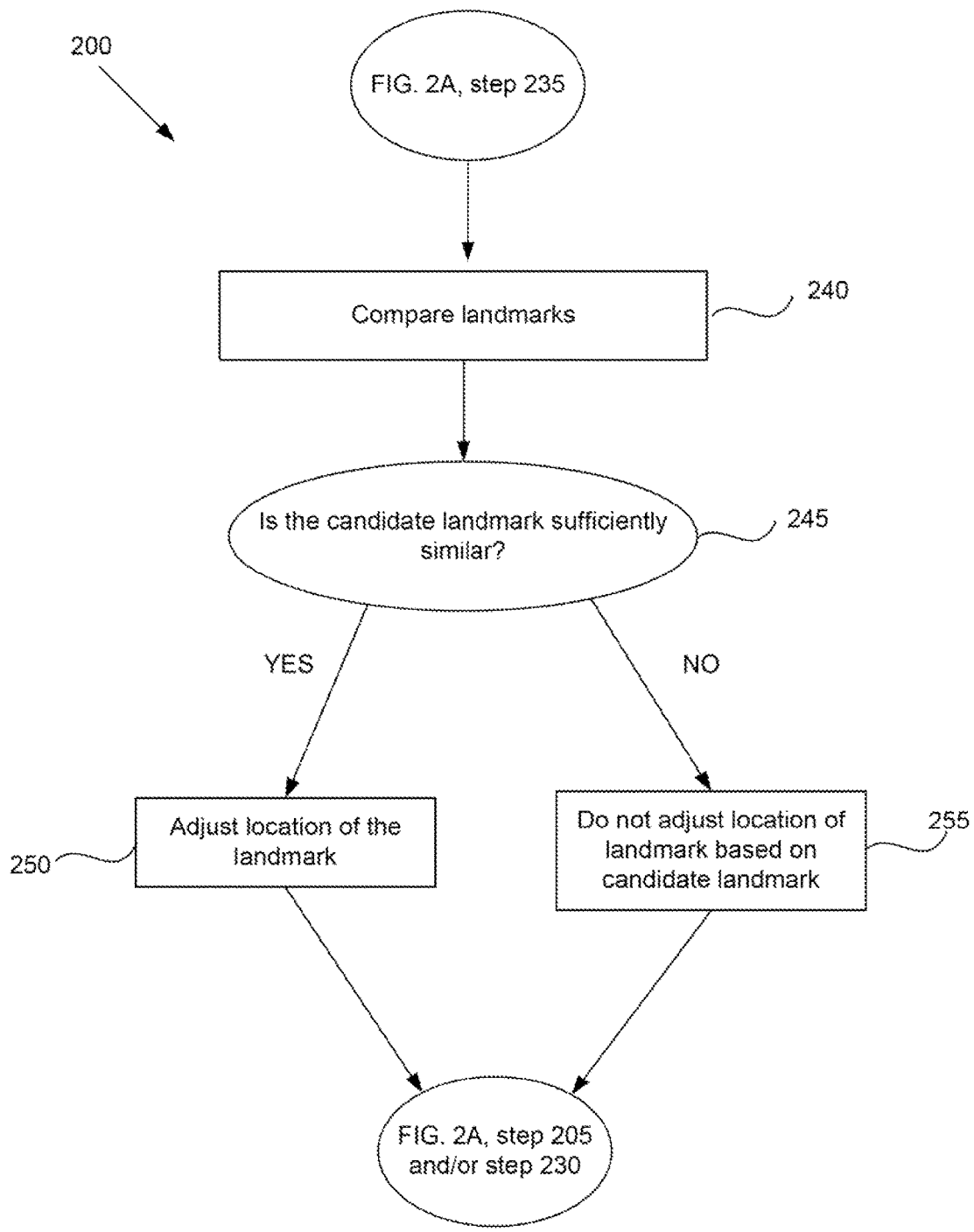

Referring next to FIGS. 2A and 2B, a method 200 for determining the location of a landmark using a map according to a particular embodiment of the present invention will be described. Initially, at step 205, the device 104 and/or the server 110 obtain trajectory data.

Trajectory data is any data that helps indicate changes in the position or movement of a device 104 over time. A wide variety of technologies can be used to generate trajectory data. By way of example, for outdoor applications, GPS data can be used to provide such information. For indoor applications, pedestrian dead reckoning (PDR) can be used to generate the trajectory data. Various implementations of PDR involve using the compass, accelerometer and/or other sensor of a device 104 to determine how far and/or in what direction the device 104a has moved from a particular reference point. A new position is then estimated and is used as a reference point for the next movement.

Figure 3:
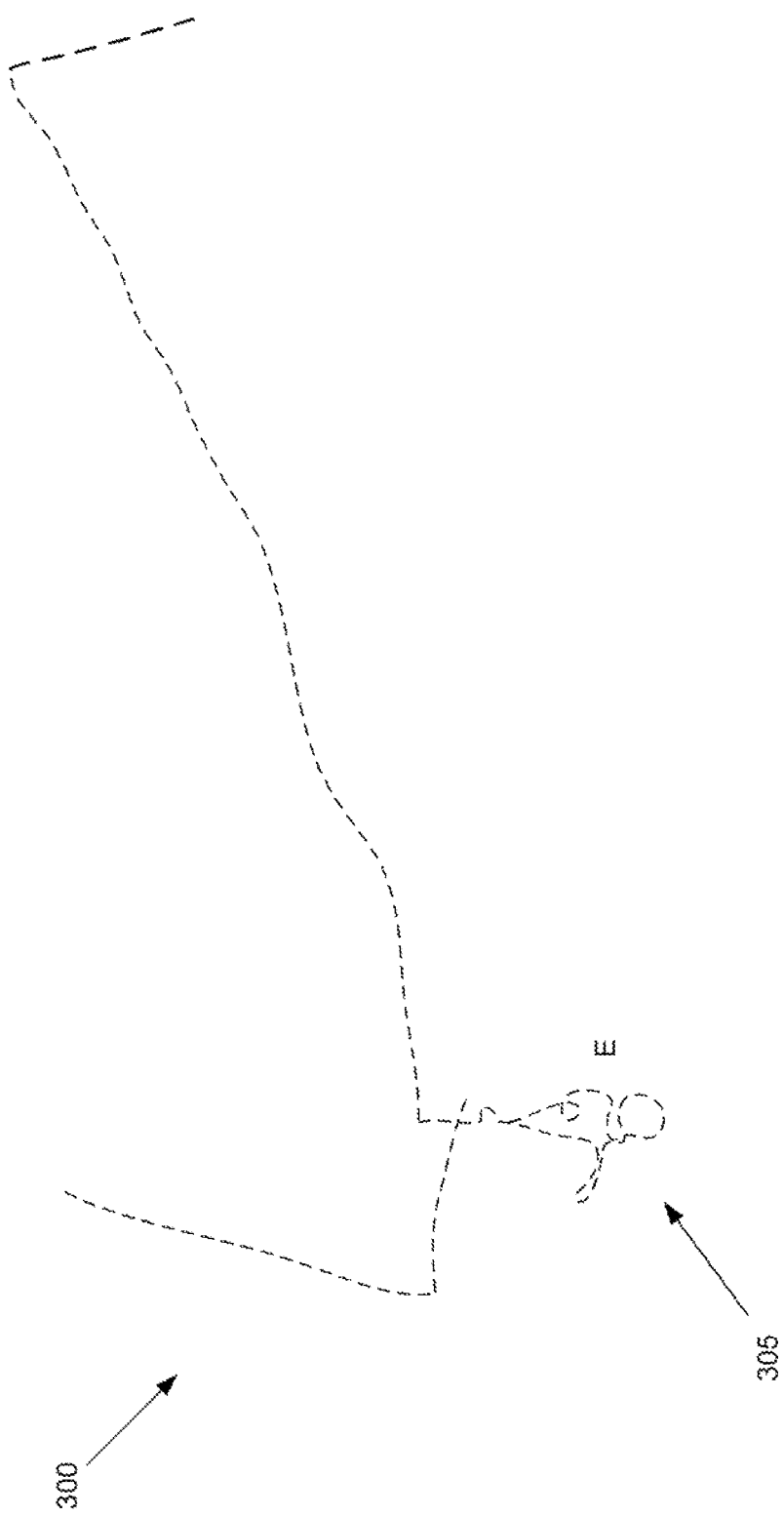
FIG. 3 is a diagram of trajectory data according to a particular embodiment of the present invention.

In some embodiments, the trajectory data indicates a plurality of points, which can form a trace. The form of the trace can generally outline or indicate a physical path that the device followed in the area. An example of such a trajectory data trace is illustrated in FIG. 3. Each point (e.g., each dash in the example trajectory data 300) is associated with a timestamp and a position (e.g., an x-y coordinate pair.) Each point in a trace is associated with a different physical location, and the sequential points indicate successive changes in the position of the device 104 and the device user over time.

In various embodiments, when the device 104 is at a physical location represented by one of the points, it uses its sensors to obtain or detect ambient signals. An ambient signal is any type of signal or environmental parameter that can be detected by the device 104. By way of example, the device 104a can detect any suitable type of radio frequency (RF) signal, such as WiFi or Bluetooth signals. The device 104 also can detect ambient signals that indicate changes in light, sound, temperature, images, magnetic fields or any other characteristic of the environment surrounding the device. To facilitate the detection and measurement of the above signals, the device 104 may include sensors such as a magnetometer, a visual sensor, a camera, a temperature sensor, an audio sensor, and a light sensor.

The device 104 is arranged to store data that indicates the intensity, strength and/or characteristics of any of the above signals at a time when the device 104 is at a particular physical location. This data is referred to herein as ambient signal fingerprint data. In various embodiments, the device 104a associates ambient signal fingerprint data with each one of multiple physical locations (e.g., each individual point in the trace 300 of FIG. 3), together with a timestamp indicating the approximate time that the data was obtained and/or when the device 104 was at the associated physical location.

The ambient signal fingerprint data may take a wide variety of forms. By way of example, if RF data is collected, the RF data may indicate the strength of signals received at the device 104 from one or more access points or transmitting devices. For example, in the case of WiFi, the device 104 may obtain received signal strength indication (RSSI) data for multiple WiFi access points in the area e.g., for access points AP1 through APn, n being any integer, the RSSI data may take the form {AP1: RSSI for signals from APE AP2: RSSI for signals from AP2, . . . APn: RSSI for signals received from APn.}

In various embodiments, once the device 104 obtains the trajectory data (which includes the aforementioned ambient signal fingerprint data), it uploads the trajectory data to the server 110. The server 110 stores and analyzes the trajectory data. At step 207, the server 110 identifies a landmark in the trajectory data.

The server 110 may determine the presence of a landmark using any suitable technique. In some embodiments, for example, the presence of a landmark is determined based on a pattern detected in the trace formed by the trajectory data. For instance, in the example illustrated in FIG. 3, a landmark is determined based on the determined speed and directional changes of the device 104 indicated by the trajectory data 300. In FIG. 3, region 305 in the trace appears to indicate that the user moved in a tight circle and/or reduced his or her speed significantly within a small area, which is understood to mean that region 305 is the location of a landmark e.g., a room or a shop. By way of example, the server 110 may determine the presence of a landmark in the trajectory data using any suitable technique described in the '054 application.

Referring back to FIG. 2, at step 210, the server 110 obtains a map of the area. The map may be any diagram, structure, image and/or data that indicates locations in an area. The map may take a wide variety of forms. In some embodiments, for example, the map is a data structure, which is stored at the server 110 and indicates a pathway layout. The map data structure associates points, paths, nodes and/or segments in the pathway layout with ambient signal fingerprint data.

Figure 4:
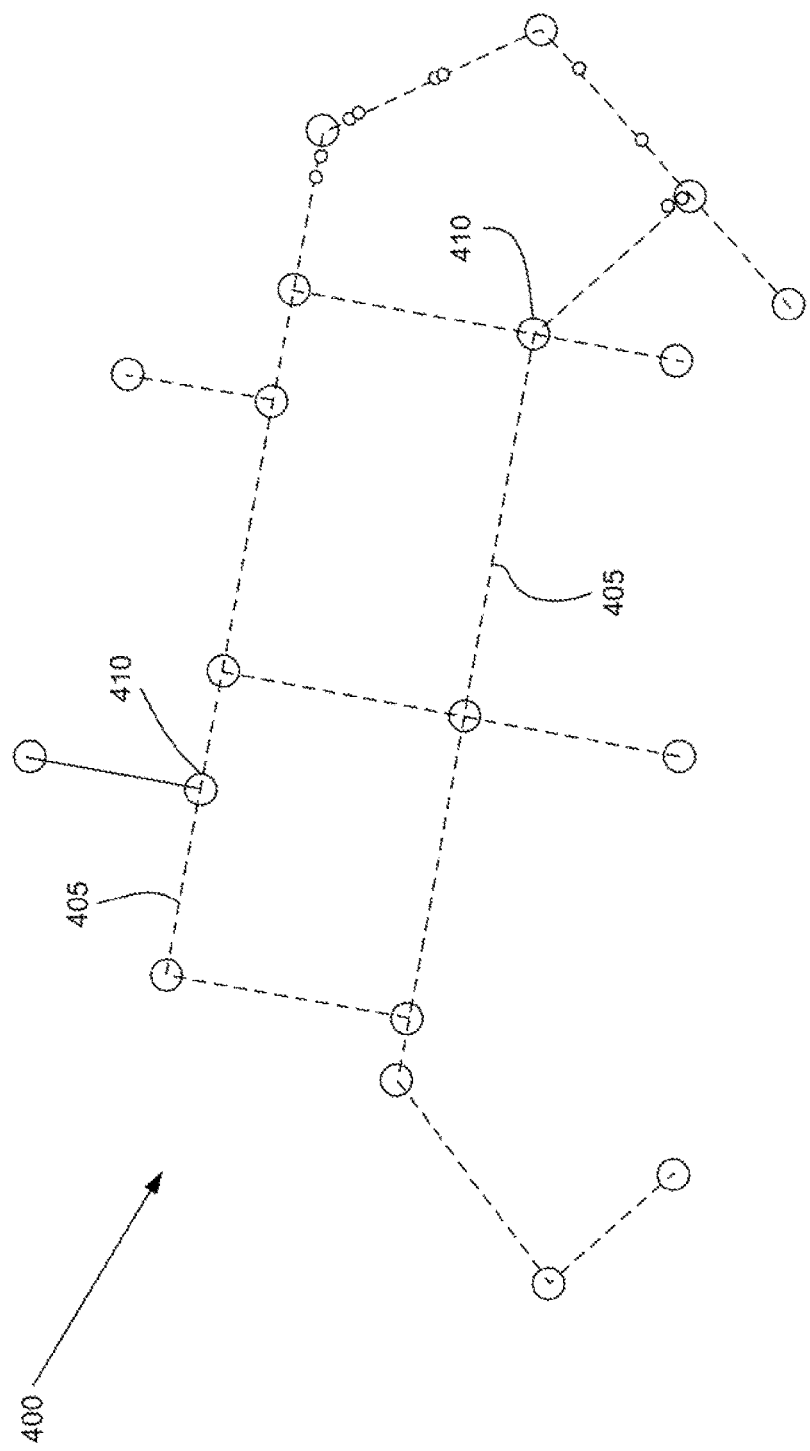
FIG. 4 is a diagram of a vector map according to a particular embodiment of the present invention.

An example of such a map is illustrated in FIG. 4. FIG. 4 is a diagram of a vector map 400. Vector is a basic data structure for storing and manipulating graphics data on a computer. Vector maps are maps which include nodes, segments and/or polygons. The map 400 includes a pathway layout in the form of nodes 410 and segments 405. In this example, each segment 405 represents a (substantially) straightline path. Each node 410 represents an intersection, corner or other location where two or more paths meet. A segment can connect two nodes, which thus indicates that a user can follow a generally straightline path between the physical location represented by the first node and the physical location represented by the second node. The segments 405 and nodes 410 are connected to form a network that outlines or indicates routes that a user can traverse to move around a particular area. In this example, that area is a shopping mall, with hallways/corridors that are represented by the segments. It should be appreciated that the map needs not take on a visual form similar to FIG. 4, but may be any data structure or information that indicates the same or similar information and associations.

Various parts of the map may be associated with additional data. In the illustrated embodiment, for example, each node 410 and segment 405 is associated with a unique ID. Each segment is made of multiple points (e.g., in the illustrated examples, each dash in a segment can be considered to be a separate point, although in actual implementations there may be many more or fewer points per segment.) As previously discussed in connection with the trajectory data (e.g., step 205), each of these points represents a physical location and is associated with ambient signal fingerprint data, a timestamp and/or any other suitable types of location-related data.

Figure 5:
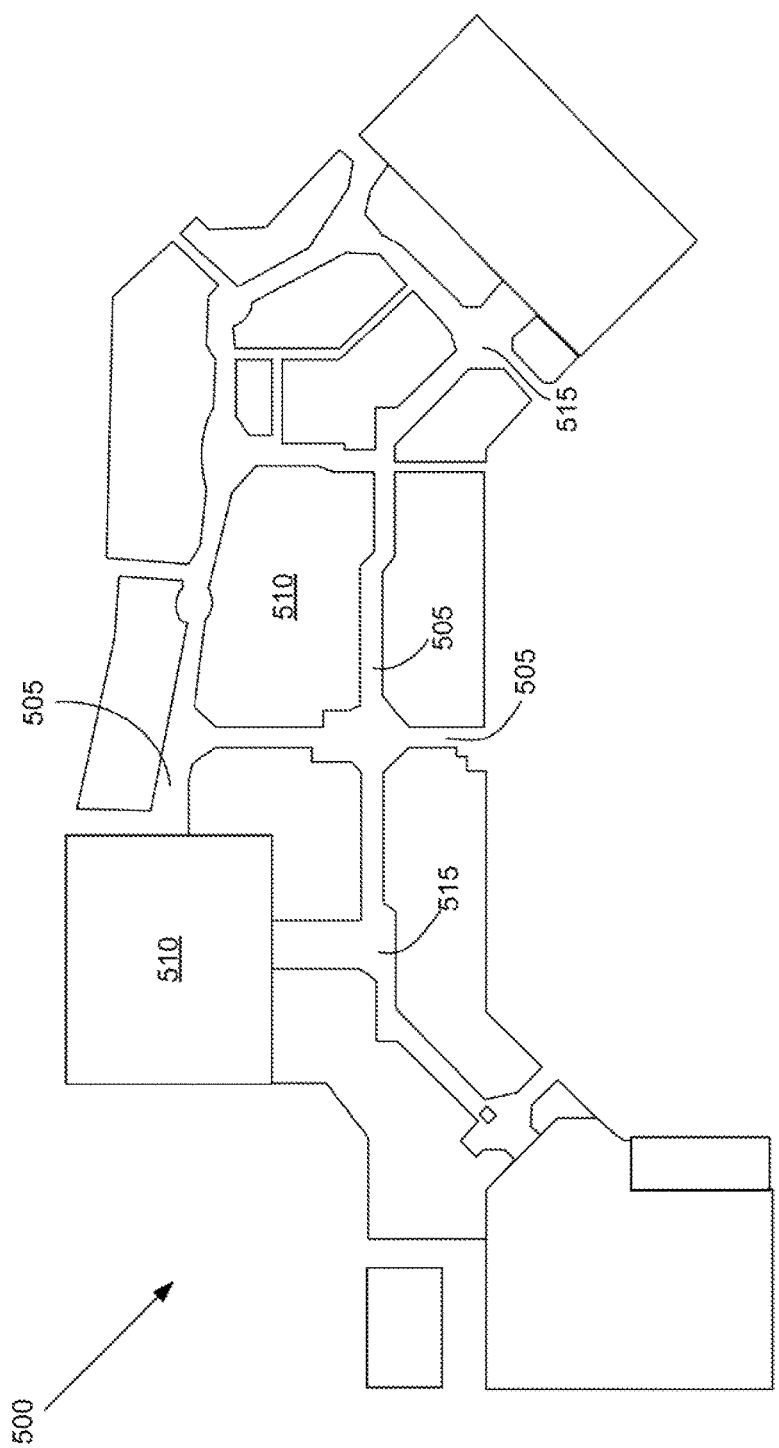
FIG. 5 is a diagram of a graphical map according to a particular embodiment of the present invention.

Another example of a type of map that the server 110 may obtain in step 210 is illustrated in FIG. 5. FIG. 5 is a diagram of a graphical map 500. The map 500 may be any type of visual representation of a map and/or be stored in any image format e.g., a raster map, an image file derived from the scanning of a hard copy of a map, etc. In this particular example, the map 500 includes hallways/corridors 505 that meet at various intersections. Multiple buildings 510 are shown as well.

The map obtained in step 210 may be generated in a wide variety of ways. In some approaches, the server 110 (or another device) derives a map data structure (e.g., the vector map 400 of FIG. 4) from a graphical map (e.g., the map 500 of FIG. 5.) This can involve scanning the graphical map, determining the locations of routes/corridors/hallways and intersections, and converting them into a pathway layout (e.g., into segments and nodes, respectively). In still other embodiments, the server 110 obtains a vector map and a graphical map of the same area (e.g., as is the case with maps 400 and 500 of FIGS. 4-5.) Aspects of the vector map (e.g., the alignment and location of the nodes and segments) are corrected based on an analysis of the graphical map. Any suitable technique may be used to perform such operations.

In some approaches, the map is generated based on trajectory data that is crowdsourced from multiple devices and/or users that have traversed a particular area. The map may, for example, be generated using any technique described in co-assigned U.S. patent application Ser. Nos. 14/571,166; 14/574,194; and 14/549,054, each of which is incorporated by reference in its entirety for all purposes. In some embodiments, the map is a linked node structure as described in U.S. patent application Ser. No. 14/571,166.

In some embodiments, various steps are taken to improve the accuracy of the map. In some approaches, for example, the map is generated using only selected trajectory data that indicates only a limited number of landmarks or no landmarks. Trajectory data that indicates many landmarks may involve users and devices that move in circles or adjust their movement speed frequently as they explore shops, rooms and other features. The resulting trajectory data can sometimes be more prone to error. As a result, it can be desirable to be selective in the types of trajectory data that are used to generate a map.

An example method for generating a map can be described as follows. Initially, the server 110 obtains candidate sets of trajectory data from multiple users and/or devices that indicate device movements at a particular area. (In this example, each candidate set of trajectory data represents the physical movements of a single device for a particular period of time.) The server 110 analyzes the sets of trajectory data and selects only particular sets of trajectory data that each does not indicate a landmark and/or only indicate less than a predefined number of landmarks (e.g., less than two, three, four or five landmarks) and/or indicates less turns and more straight lines. It is feasible to segment the trajectory into hallway parts and landmark parts after applying the results from the landmark detection step (step 207.) Only the hallway parts of the trajectory are used to generate the hallway map (i.e., the parts of the trajectory data that indicate a landmark are not used.) In various embodiments, the server 110 uses the techniques described in step 207 to detect the number and/or presence of landmarks in each candidate set of trajectory data.

The server 110 then uses the selected sets of trajectory data to generate the map (e.g., using any of the aforementioned techniques described herein or in the co-assigned applications.) Put another way, the trajectory data is used to determine the location and characteristics of map elements (e.g., segments, nodes, paths, routes, intersections, ambient signal fingerprint data, etc.). The above process may be repeated. That is, new candidate sets of trajectory data may be used and the map/pathway layout may be further adjusted accordingly. In various implementations, this process continues until the locations/characteristics of the map elements are no longer changing beyond a predefined criteria If the vector map is used as an example, the criterion consists of the following rules: a. For the generated vector map at each round, there are no newly added hallway structures, such as nodes or segments; b. For each node on the hallway map, their positions are not being updated beyond a small threshold; c. For each segment on the hallway map, their lengths are not being updated beyond a small threshold. At this point, it is assumed that the map has achieved a reasonable level of accuracy. In various implementations, the resulting map does not indicate any landmarks and the above process is not used to determine the locations of any landmarks. One or more landmarks, however, may be added later e.g., as discussed in step 220 and 225.

Referring back to method 200 of FIG. 2, at step 215, the server 110 matches the trajectory data with the map. Put another way, the server 110 matches and/or compares at least portions of the trajectory data with portions of the pathway layout indicated in the map to determine whether they are corresponding to the same physical locations. For example, a segment of the path defined by the trajectory data (and its associated ambient signal fingerprint data) may be compared to a segment of a map (and its associated ambient signal fingerprint data) to see if they are representing the same hallway, corridor or path. This comparison is repeated multiple times for one or more parts of the trajectory data and one or more parts of the map.

Any suitable technique may be used to perform the above matching. In some embodiments, for example, the ambient signal fingerprint data for points in the trajectory data are compared to the fingerprint data for points in the map. If the fingerprint data is found to be sufficiently similar (e.g., if the Tanimoto similarity of the fingerprint data for a sufficient number of points in the trajectory data and the map is found to exceed a particular threshold), then a match is found. In other embodiments, a particle filter is used to match portions of the trajectory data and the map. In some approaches, the matching involves a shape comparison. That is, the shape, characteristics and distances of a trace defined by the trajectory data is compared to those of the passages/paths in the map to determine whether they match. Other matching methods, such as segment-based, sequence-based and WiFi peak-based approaches, which will be discussed later in the application, may be used as well.

Based on the matching of the trajectory data and the map, the server determines the location of the landmark in the map (step 220.) Any suitable technique may be used to determine the location of the landmark. In some embodiments, for example, the trajectory data indicates that the landmark covers multiple points (e.g., the dashes in region 300 of FIG. 3.) As previously discussed, each point may be associated with ambient signal fingerprint data, which can be represented by an RSSI vector. In various embodiments, each RSSI vector indicates the strength of signals received from a particular RF access point or transmitter at the associated point. Thus, if the area includes multiple access points or transmitters, each point is associated with a set of multiple RSSI vectors. The RSSI vectors for each access point/transmitter may be averaged across the points in the landmark region. The determination of the location of the landmark is based on the averaged RSSI vectors e.g., by comparing them against ambient signal fingerprint data for one or more segments/nodes in the map. In determining the location of the landmark, some RSSI vectors may be weighed differently than others. For example, RSSI vectors may be weighed based on the beacon ratio i.e., access points/transmitters whose signals appear more frequently may be weighed more. The weighing may also be based on the relative strengths of the signals for particular access points/transmitters. In various embodiments, once the location of the landmark is determined, the landmark location is then placed on, added to and/or associated with the map.

The aforementioned matching of the trajectory data to the map (step 215) and the associated determination of the location of a landmark (step 220) may be performed in a wide variety of ways. Three example approaches, a segment-based approach, a sequence-based approach, and a WiFi peak-based approach, are described below. An example of a segment-based approach is illustrated in FIG. 6 and FIGS. 7A-7C.

Figure 6:
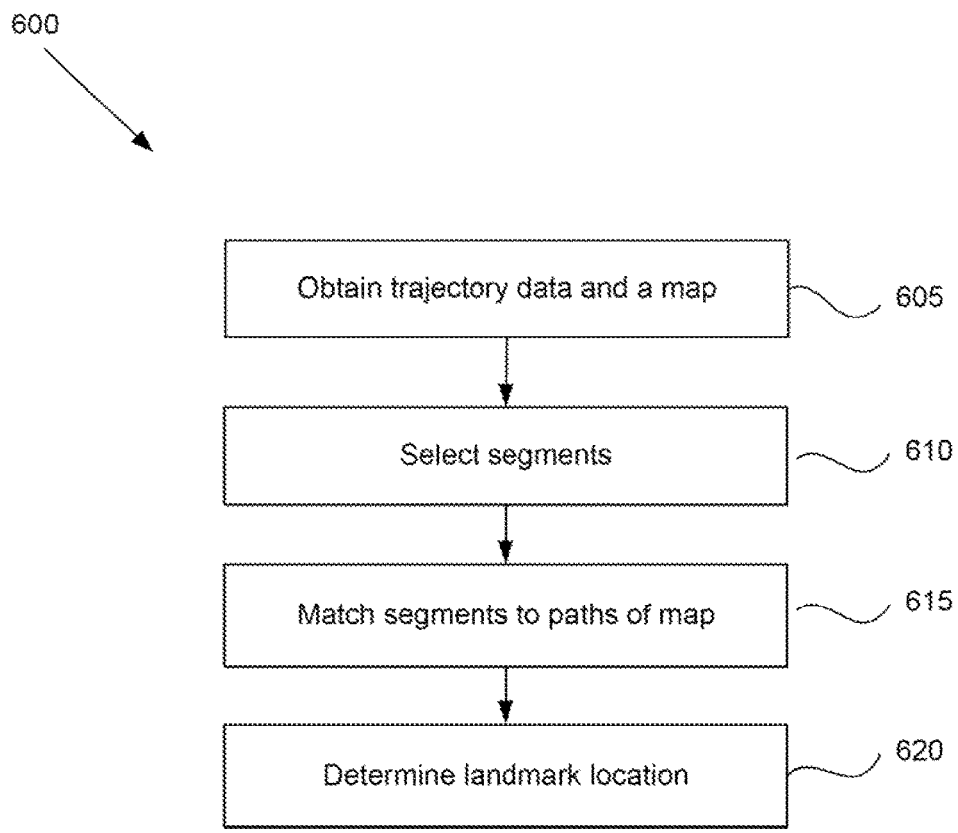
FIG. 6 is a flow diagram illustrating a method for segment-based matching according to a particular embodiment of the present invention.
Figure 7A:
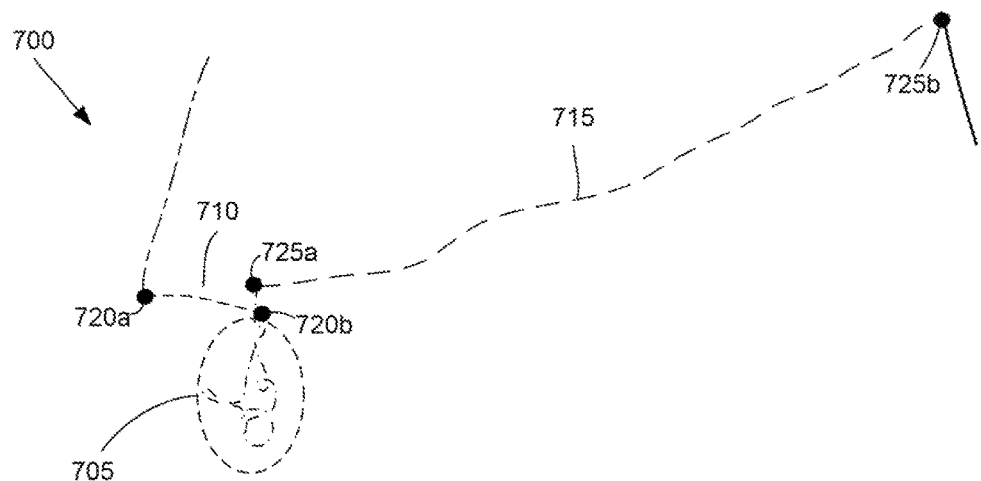
FIGS. 7A-7C are diagrams illustrating steps in a segment-based matching operation according to a particular embodiment of the present invention.
Figure 7B:
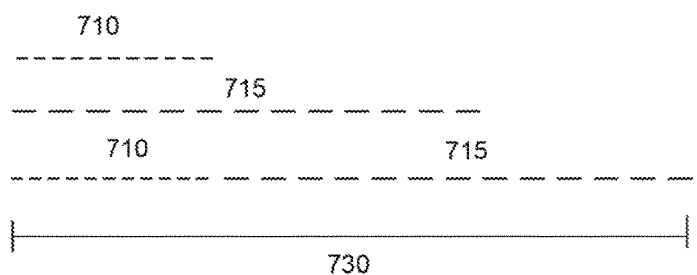
Figure 7C:
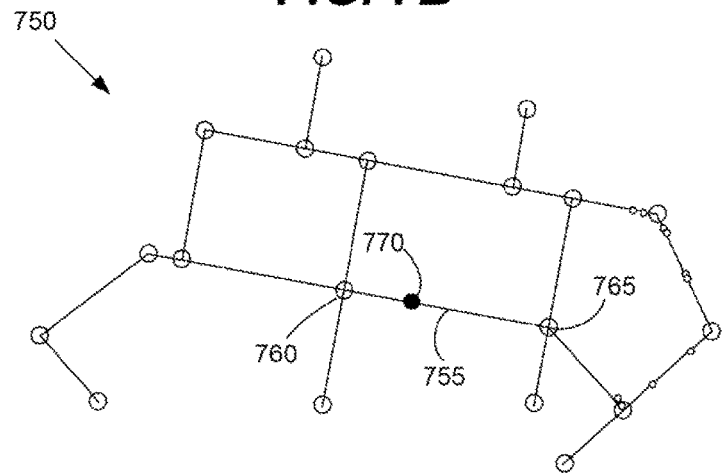

FIG. 6 indicates the steps of an example segment-based matching method 600. At step 605, the server 110 obtains trajectory data and a map e.g., as described in step 205 and 210 of FIG. 2. Example trajectory data 700, which is generally the same as trajectory data 300 of FIG. 3, is shown in FIG. 7A. The server 110 has determined that the trajectory data 700 indicates a landmark 705. This determination may be made using any suitable technique e.g., as described in connection with step 205 of FIG. 2. In this example, the map obtained in step 605, which is illustrated as map 750 in FIG. 7C, is the same as the map 400 of FIG. 4.

At step 610, the server 110 selects or identifies one or more segments in the trajectory data 700. In various embodiments, the segments are adjacent to and/or in the vicinity of a landmark. In other implementations, the selected segments intersect at the landmark and/or form substantially straight paths. In the illustrated example, the server 110 thus selects segments 710 and 715, which meet at and are on opposite sides of the landmark. Segment 710 is a substantially straight segment extending between points 720a and 720b. Segment 715 is a substantially straight segment extending between points 725a and 725b. Generally, only a limited number of segments are selected (e.g., only those segments that are near, within a predetermined distance of and/or adjacent to the landmark, etc.)

At step 615, the server 110 compares and/or matches the selected segments with paths/segments of the map. The segments to be compared are illustrated in FIG. 7B. Note that any one or any combination of the segments may be compared to and/or matched with the paths/segments of the map 750. For instance, in the example illustrated in FIG. 7B, the server 110 may use segment 710, segment 715, and/or a longer segment 730 consisting of a combination of segment 710 and segment 715 for this matching and comparing operation. Generally, the more segments match with the paths/segments of the map 400 (e.g., segment 710 combined with segment 715), the more accurate the match tends to be.

The above matching operations may use any suitable technique (e.g., as discussed in step 215 of FIG. 2.) In the illustrated embodiment, for example, the server 110 compares the ambient signal fingerprint data associated with points in segments 710, 715 and 730 with the ambient signal fingerprint data associated with points in the segments of the map 750. FIG. 7C illustrates an example of the results of the above matching operation. In this example, the server 110 determines that segment 755 in the map 750 matches with segment 730. That is, the characteristics of the points in segment 755 (e.g., their order, the associated ambient signal fingerprint data, etc.) sufficiently match those of the points in segment 730.

At step 620, the server 110 determines the location of the landmark in the map. This step may be performed using any technique described in connection with step 220 of FIG. 2. In some embodiments, the server 110 determines the location of the landmark based on the positions of the matched trajectory data segments (e.g., segment 730) relative to the landmark and/or the lengths of the segments.

In the illustrated embodiment, for example, let it be assumed that the length of the segment 710 is A and the length of the segment 715 is B. Segment 730, which is the combination of segments 710 and 715, has been matched to segment 755 of the map 750. Additionally, the server 110 determines that the ambient signal fingerprint data for nodes 760 and 765 of the map 750, which are connected by segment 755, match those of points 720a and 725b in the trajectory data 700. Accordingly, the server 110 determines that the location of the landmark is at a location along segment 755 of the map 750 and can be determined based on the lengths of the segments i.e., a distance A from node 760 and a distance B from node 765. The determined location of the landmark is illustrated by landmark 770 in FIG. 7C.

An advantage of the above sequence-based approach is that it may require less overhead to implement. That is, in various embodiments, only a limited set of one or more segments (e.g., only segments in the vicinity of the landmark, only segments (and associated data) adjacent to the landmark, like segments 710 and 715, etc.) are used for the matching and other parts/segments of the trajectory data 700 are not used.

Various other approaches may also be used to match trajectory data to a map and to determine the location of a landmark in the map (e.g., steps 215 and 220 of FIG. 2A.) Another approach is referred to as a sequence-based approach, which is described using an example illustrated in FIGS. 8 and 9A-9B.

Figure 8:
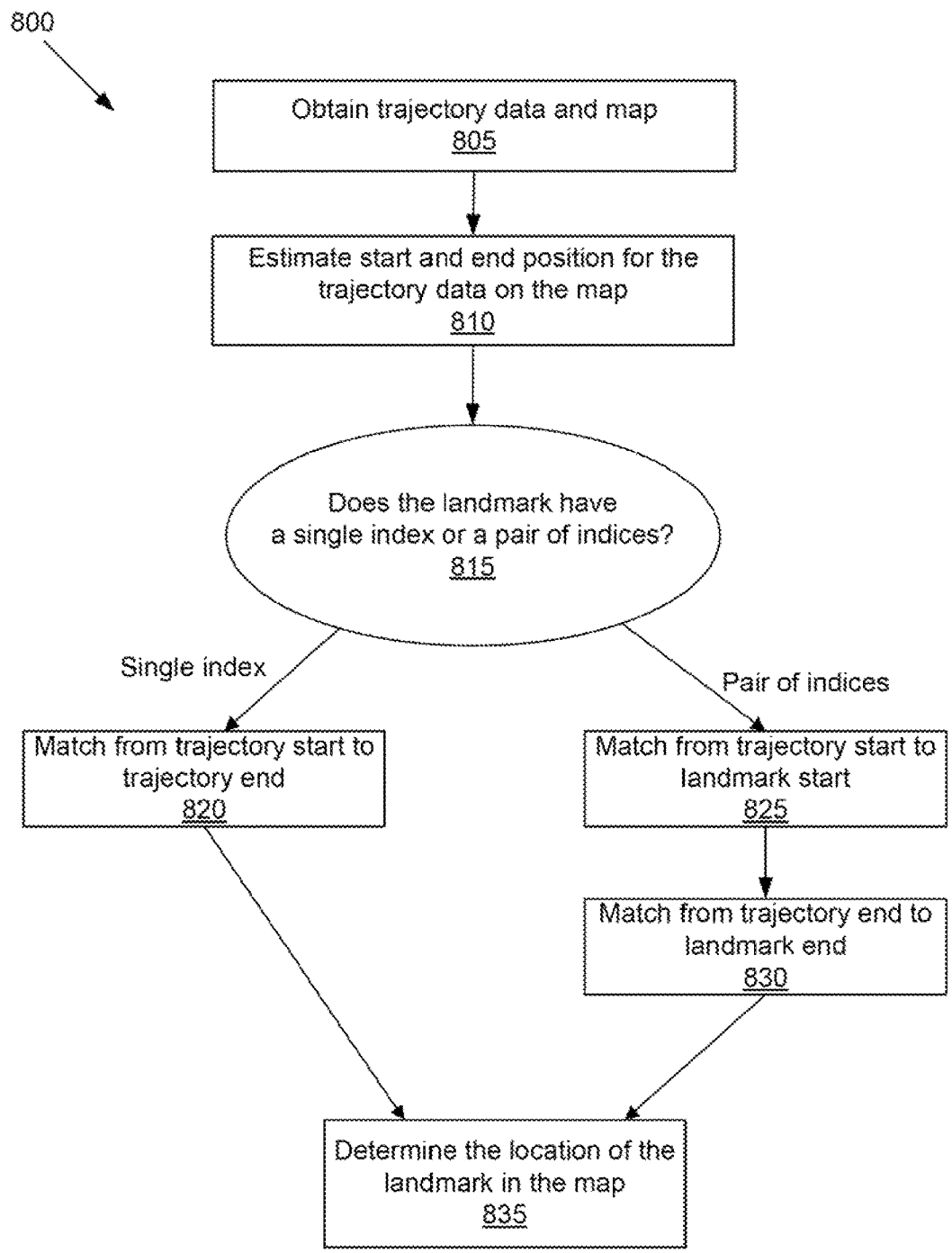
FIG. 8 is a flow diagram illustrating a method for sequence-based matching according to a particular embodiment of the present invention.

FIG. 8 indicates steps for an example sequence-based approach. At step 805, the server 110 obtains trajectory data and a map. This step may be performed as previously discussed in connection with step 205 and 210 of FIG. 2A. In this example, the obtained trajectory data is illustrated by trajectory data 900 of FIG. 9A, which is generally the same as the trajectory data 300 of FIG. 3. The trajectory data 900 forms a trace that starts at point 905 and ends at point 910. The trajectory data 900 further indicates a landmark 915. In this example, the server 110 also obtains the map 950 illustrated in FIG. 9B, which is generally the same as the map 400 illustrated in FIG. 4.

At step 810, the server 110 estimates the location for the start and end points 905/910 of the trajectory data in the map 950. The server 110 may use any suitable technique to do this. In some embodiments, for example, the server 110 compares and matches the ambient signal fingerprint data of the trajectory data start and end points 905/910 (and/or those of other nearby points) to those of points, segments and/or nodes in the map. Alternatively or additionally, the server 110 makes the above estimation using other data associated with the aforementioned points. In various implementations, for example, at least some of the points of the trajectory data 900 are associated with GPS data.

The GPS data may be used to identify points in the trajectory data 900 when a user or a device entered or exited a building. For example, if the GPS data for a particular point in the trajectory data 900 indicates that the GPS signal was just lost or greatly weakened, it may indicate that the device 104 has just gone into the building and/or is at an entrance to the building. Various techniques for identifying entrances or exit points using GPS data are described in co-assigned U.S. patent application Ser. No. 14/549,054, which is incorporated by reference herein in its entirety for all purposes. Any of the techniques described in the aforementioned application may be used to identify points in the trajectory data 900 (e.g., building entrance and exit points) that correspond to points/nodes in the map 950. Since some map implementations also indicate entrance and exit points, such information may be used to match entrance and exit points in the map with the identified points in the trajectory data 900. In the illustrated embodiment, as a result of the performance of step 810, the server 110 associates start point and end points 905/910 in the trajectory data 900 with nodes 955 and 960, respectively, in the map 950.

At step 815, the server 110 determines whether the landmark 915 in the trajectory data 900 has a single index or a pair of indices. Put another way, the server 110 determines whether the landmark 915 can be represented by a single point in the trajectory data 900, or by multiple points in the trajectory data 900. The former, for example, may correspond to a smaller landmark that takes up limited space and/or lacks any entrance or exit e.g., a water fountain, a kiosk, a sign, any landmark that can be or is represented by a single trajectory data point, etc. The latter may correspond to a larger landmark, which is represented by multiple points and/or which has an entrance and/or an exit e.g., a shop or a room. In the illustrated embodiment of FIG. 9A, for example, the server 110 determines that the landmark 915 has a pair of indices, since the landmark 915 appears to be a room that is covered by multiple points in the trajectory data (e.g., as represented by the twisting trace in the circled region.) The landmark 915 also appears to have an entrance point, represented by point 920 in FIG. 9A.

If it is determined that the landmark 915 has a single index, then the server 110 compares all the points in the trajectory data 900 (e.g., all points along the trace between the start point 905 and the end point 910) with points in the map 950 to determine if there is a match (step 820). This comparing and matching operation may be performed using any matching technique described herein e.g., as discussed in connection with step 215 of FIG. 2A. In some embodiments, a particle filter is used to perform the above matching. In still other embodiments, the server 110 determines a Tanimoto similarity of ambient signal fingerprint data associated with each point in the trajectory data 900 with fingerprint data associated with each point in the map 950. If the similarity exceeds a predefined threshold for a sufficient number of points in the trajectory data 900, a match is found. Once it is determined that a match has been found, the method 800 proceeds to step 835.

Returning to step 815, if it is determined that the landmark 915 has a pair of indices, then the server 110 performs two types of matching operations, which each involve comparing characteristics (e.g., ambient signal fingerprint data) of points in the trajectory data 900 to those of points in the map 950: (1) forward matching, which involves comparing points in the trajectory data 900 from the start point 905 to a start/entrance point for the landmark 915 (step 825); and (2) backward matching, which involves comparing points in the trajectory data 900 from the end point 910 to the end/exit point for the landmark 915 (step 830). Based on the comparison, the server 110 determines whether there is a sufficient match between the trajectory data 900 and the map 950. This comparison and matching of points may be performed using any known technique or method described herein (e.g., the techniques described in connection with step 815 of FIG. 8.)

Figure 9A:
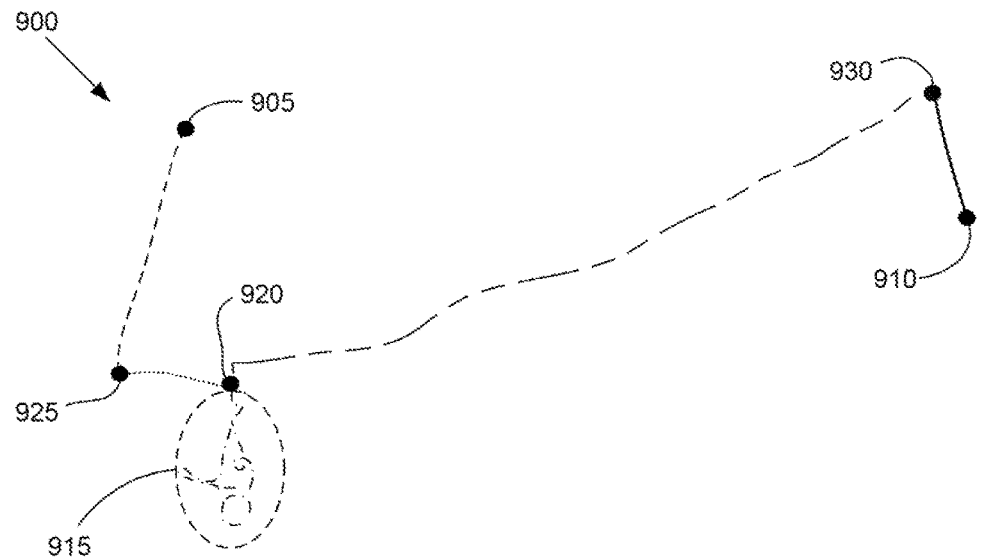
FIGS. 9A-9B are diagrams illustrating steps in a sequence-based matching operation according to a particular embodiment of the present invention.
Figure 9B:
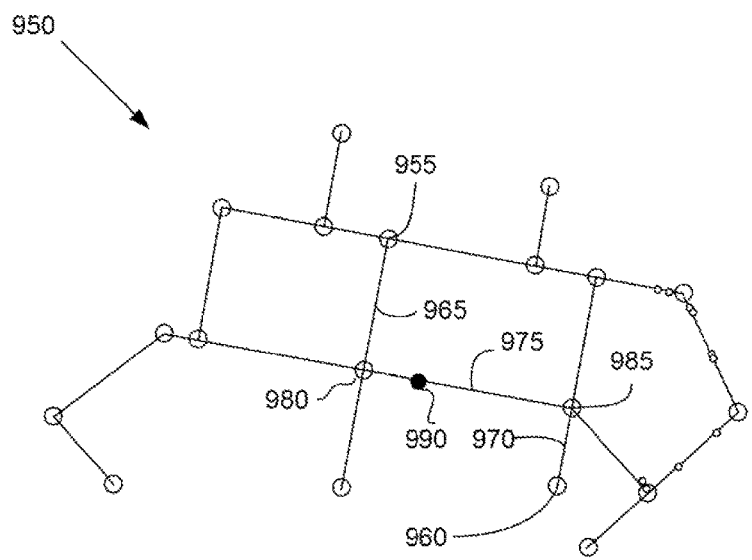

In the example illustrated in FIGS. 9A-9B, the server 110 determines that the start/entrance point and the end/exit point for the landmark 915 are the same point, point 920 in FIG. 9A. Thus, the server 110 compares and matches the following two sets of points with points in the map: (1) all points along the trace between points 905 and 920 in the trajectory data and (2) all points along the trace between points 910 and 920. In this example, the server 110 does not attempt to compare or match other points in the trajectory data 900 (e.g., the points in the circle region that are in the landmark 915) with points in the map. Based on the above matching, the server 110 then determines that the above trajectory data corresponds to segments 965, 975 and 970 of the map (FIG. 9B.)

The server 110 then determines the location of the landmark in the map 950 based on the above matching (step 835). To determine the location of the landmark in the map 950, the server 110 may use any suitable technique. In some embodiments, for example, the server 110 determines that the landmark is situated along a segment defined in the trajectory data and further determines which segment in the map corresponds to the segment in the trajectory data. Then, the proper orientation must be determined. Put another way, for example, the "left side" and "right side" of the segment in the trajectory data may be associated with different portions or sides of the corresponding segment in the map. In various embodiments, the server makes the above determinations based on the matching performed in steps 820, 825 and/or 830.

In the illustrated embodiment, for example, the server 110 determines that nodes 980 and 985 in the map 950 correspond to points 925 and 930 in the trajectory data. This determination is made based on the aforementioned matching step (e.g., step 825 and 830.) Based on an analysis of the trajectory data 900, the server 110 further determines that the entrance/exit point 920 for the landmark 915 is a distance A from point 925/node 980 and a distance B from point 930/node 985. Accordingly, the server 110 estimates that the entrance/exit point for the landmark is approximately at point 990 in the map 950. It should be noted that in some applications, the entrance/exit points may have different locations in the map 950. The server 110 can estimate these different locations based on the aforementioned trajectory data 900 and matching operations.

An additional method for matching trajectory data and determining the location of a landmark (i.e., steps 215 and 220 of FIG. 2A) involves a WiFi peak-based approach. An example WiFi peak-based approach is described in FIGS. 10 and 11A-11D. It should be appreciated that although this example involves WiFi signals, any type of RF signal or protocol may be used e.g., Bluetooth, WiFi, etc.

Figure 10:
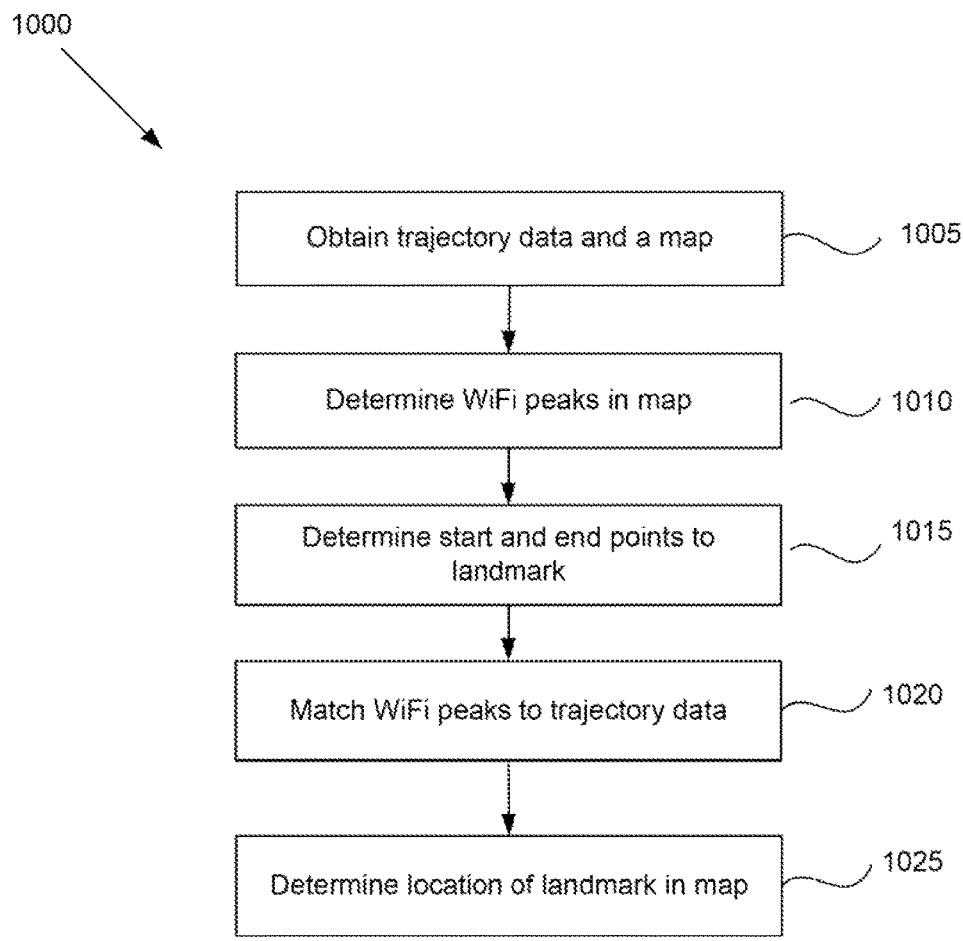
FIG. 10 is a flow diagram illustrating a method for WiFi-peak-based matching according to a particular embodiment of the present invention.
Figure 11A:
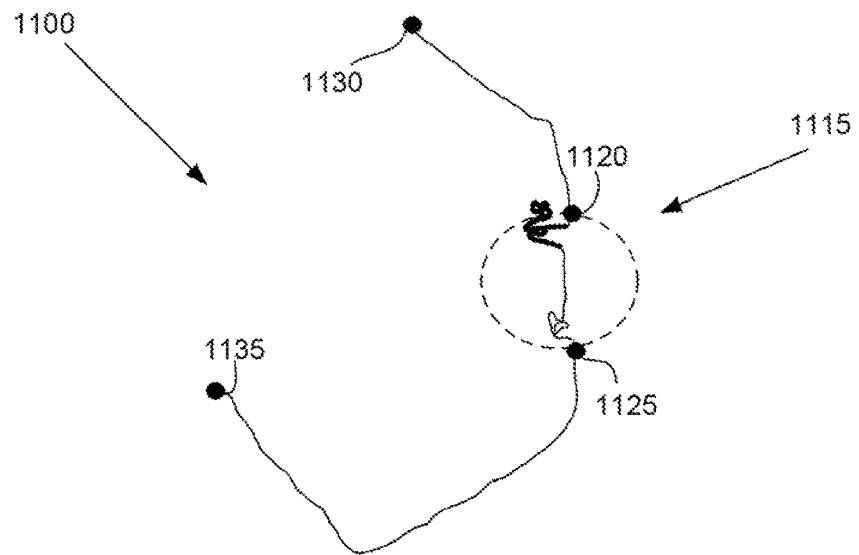
FIGS. 11A-11D are diagrams illustrating steps in a WiFi-peak-based matching operation according to a particular embodiment of the present invention.
Figure 11B:
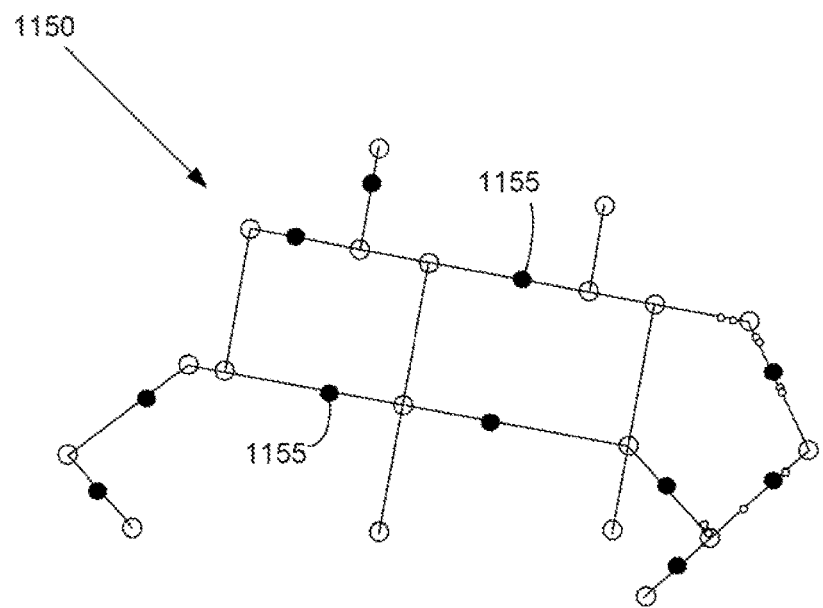

FIG. 10 is a flow diagram indicating an example application of the WiFi peak-based approach. At step 1005, the server 110 obtains trajectory data and a map. Examples of trajectory data 1100 and a map 1150 are shown in FIGS. 11A and 11B. The illustrated trajectory data 1100 and map 1150 may have any of the characteristics (e.g., points, nodes, associated fingerprint data, etc.) described above and in connection with steps 205 and 210 of FIG. 2. In this example, the trajectory data 1100 is made of multiple points that are each associated with a physical location and ambient signal fingerprint data. The trajectory data 1100 also indicates a landmark 1115 e.g., a room or shop.

The map 1150, which is illustrated in FIG. 11B, includes nodes connected with segments. Each segment is also made up of multiple points, which are each associated with a physical location and ambient signal fingerprint data. The aforementioned ambient signal fingerprint data includes WiFi signal strength information i.e., data that indicates the strength of signals received at the associated physical location from one or more WiFi access points in the area represented by the map.

At step 1010, the server 110 determines WiFi peaks in the map. That is, for each of one or more segments in the map 1150, the server 110 determines the point in the segment that is associated with the highest WiFi signal strength for a particular WiFi access point. In various embodiments, the server 110 determines the WiFi peaks for one, more than one or all the accessible WiFi access points in the area. In FIG. 11B, the WiFi peak point for a particular access point and in each segment is shown as points 1155. It should be noted that although this example involves a WiFi peak, the peak could instead involve any other RF signal or ambient signal (e.g., Bluetooth, etc.)

At step 1015 of FIG. 10, the server 110 identifies and determines start and end points to the landmark in the trajectory data 1100. This may be performed using any suitable technique, including any technique described in the '054 application. In various embodiments, the server 110 determines the start and end points to the landmark based on analysis of the trajectory data 1100 and the timestamps, which indicate a direction of movement of a device 104 along the path defined by the trajectory data 1100. The start and end points can refer to a point where a device/user entered the landmark 1115 (e.g., if the landmark is a room or shop) and a point where a device/user exited the landmark 1115. In the example illustrated in FIG. 11B, the start and end points to the landmark 1115 are illustrated as points 1120 and 1125. The start and end points for the trace defined by the trajectory data 1100 are points 1130 and 1135. That is, according to the timestamps associated with the points in the trajectory data 1100, the device moved from point 1130 through points 1120, 1125 and 1135, in that order, over time.

Afterward, the server 110 matches the WiFi peaks identified in the map 1150 to portions of the trajectory data 1100. The server 110 may perform this operation in any suitable manner. In the illustrated embodiment, for example, the server 110 determines the similarity (e.g., Tanimoto similarity) between ambient signal fingerprint data for each WiFi peak (e.g., the fingerprint data for points 1155 in FIG. 11B) and the fingerprint data for each point in the trajectory data 1100. This similarity determination is performed using fingerprint data associated with the same WiFi access point/RF transmitter, and may be repeated for each access point/RF transmitter. Generally, the server 1100 determines the similarity between the WiFi peaks and those portions of the trajectory data that are outside the landmark e.g., portions of the trajectory data 1100 that are outside the portion of the trace between the start point of the landmark (e.g., point 1120) and the end point of the landmark (e.g., point 1125.) In various implementations, a match is found between the peak and the point if the similarity exceeds a predefined threshold.

Figure 11C:
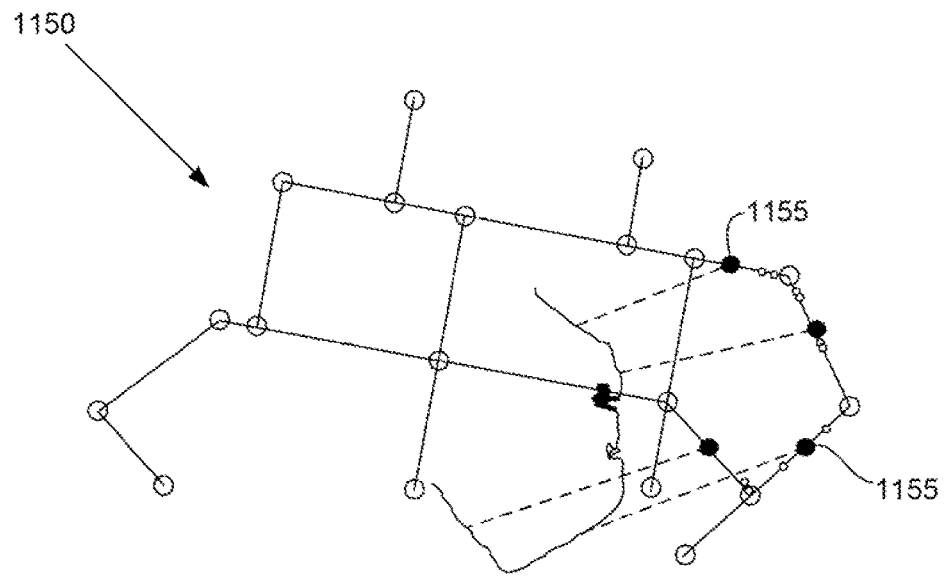

Based on the above determination, the server 110 matches particular WiFi peaks to points in the segments of the map. An example of this is shown in FIG. 11C. FIG. 11C illustrates the trajectory data 1100 superimposed over the map 1150. There are lines connecting points on the trajectory data 1100 and WiFi peak points 1155 in the map 1150. These lines indicate that a match has been found between the ambient signal fingerprint data for those peaks and their respective trajectory data points.

Figure 11D:
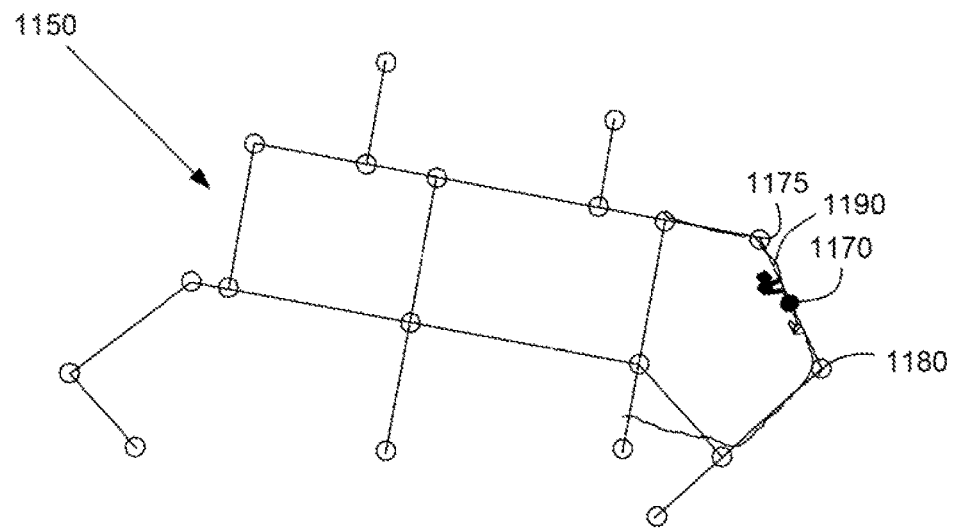

This matching enables the server 110 to determine the portions and paths on the map that the trajectory data corresponds to. An example of this is shown in FIG. 11D, which graphically indicates how, based on the matches illustrated in FIG. 11C, the trajectory data 1100 can be slightly rotated and aligned to fit into a portion of the map 1150. Put another way, the server 110 matches segments/paths in the trajectory data 1100 with segments/paths in the map 1150 based on the matching performed in step 1020.

Once the matching has been completed, the server 110 determines the location of the landmark in the map. Any suitable technique may be used to determine the location of the landmark in the map (e.g., as described in connection with step 220 of FIG. 2, step 620 of FIG. 6 or step 835 of FIG. 8.) In the illustrated embodiment of FIG. 11D, the matching of the segments and the alignment of the trajectory data 1100 on the map 1150 helps reveal that the location of the landmark is at point 1170 on the map, which is between node 1175 and node 1180.

Returning to method 200 of FIG. 2A, once the location of the landmark in the map is determined, in various embodiments, the map is updated to include or indicate the landmark (step 225). This adjustment may be performed in a variety of ways. For example, if the map is graphical, a graphical indicator of the landmark may be added to the map. In some embodiments where the map is represented by a data structure (e.g., the nodes and segments of map 400 of FIG. 4 or map 1150 of FIG. 11D), additional data is added to or associated with the structure to indicate the location of the landmark.

In the example illustrated in FIG. 11D, for instance, the data added to the map 1150 that indicates the location of the landmark may be represented using the following parameters: [SEGMENT ID]; [DISTANCE, START NODE]. Put another way, [SEGMENT ID] indicates one of the segments in the map that the landmark (or entrance to the landmark) is on. [DISTANCE] is a parameter indicating the distance along the segment (e.g., segment 1190) that separates the location of the landmark from one of the nodes, which is identified by a node ID i.e., [START NODE.] Thus, the location of the landmark in FIG. 11D may be represented as follows: [segment 1190][0.4, node 1175], which means that the landmark is situated on segment 1190 and is 40% of the length of the segment away from node 1175. Of course, the above is an example implementation and it should be appreciated that the location of the landmark may be represented using any type of data or data structure.

After the server 110 has determined the location of a landmark in the map using steps 205-225, the server 110 may obtain additional trajectory data for the same area covered by the map (step 230). The new trajectory data may have been received from a different device, or the same device that is traversing the area another time. The new trajectory data may be used to adjust the location of a landmark in the map. Over time, such adjustments can help improve the accuracy of the landmark location.

Figure 12:
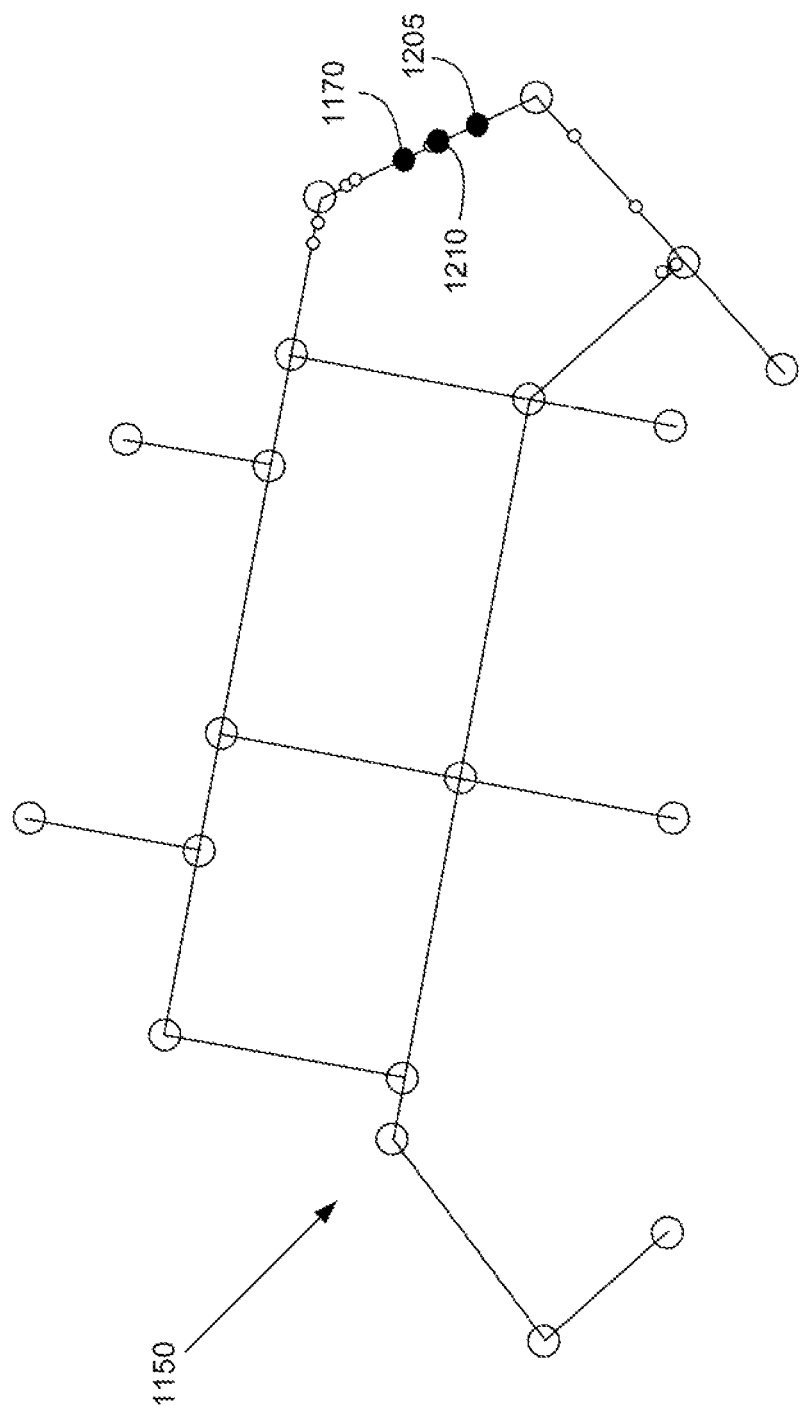
FIG. 12 is a diagram illustrating the adjustment of the location of a landmark according to a particular embodiment of the present invention.

At step 235, the server 110 analyzes the new trajectory data and performs the techniques described in connection with step 205-220 to determine the location of a candidate landmark in the new trajectory data. An example of this step is shown in FIG. 12. FIG. 12 indicates the map 1150 illustrated in FIG. 11D. The map 1150 indicates a landmark 1170, whose location was previously determined in step 220. The server 110 has also determined the location of a new, candidate landmark 1205 based on an analysis of new trajectory data.

The method 200 of FIG. 2A then proceeds to step 240 of FIG. 2B. At step 240, the server 110 compares the landmark 1170 with the candidate landmark 1205. This comparison may be performed in any suitable manner. In some embodiments, for example, the server 110 determines a distance between the point associated with the landmark 1170 and the point associated with the candidate landmark 1205. Additionally or alternatively, the server 110 compares or determines the similarity (e.g., Tanimoto similarity) of the ambient signal fingerprint data for one or more points representing the landmark 1170 and the ambient signal fingerprint data for one or more points representing the candidate landmark 1205.

At step 245, the server 110 determines whether the landmark and the candidate landmark are sufficiently similar. If they are, then it is assumed that they represent the same landmark. For example, the server 110 may determine that they are sufficiently similar if the distance between them falls below a predefined threshold and/or if the similarity of the ambient signal fingerprint data for the landmark and the candidate landmark exceeds a predefined threshold. In some embodiments, to be sufficiently similar, the landmark and the candidate landmark must (also) be at least on the same segment of the map and/or the same side of the segment. If the server 110 determines that the candidate landmark and the landmark are not sufficiently similar, then the server does not adjust the location/characteristics of the landmark based on the candidate landmark (step 255). The method then proceeds back to step 205 and/or step 230.

If the server 110 determines that the landmark and the candidate landmark are sufficiently similar, the server 110 adjusts the location/characteristics of the landmark based on the estimated location/characteristics of the candidate landmark (step 255). This may be performed in a variety of ways. In some implementations, for example, the server 110 adjusts the ambient signal fingerprint data for the landmark based on the ambient signal fingerprint data for the candidate landmark. For instance, a simple approach would be to have the new fingerprint data for the landmark be the average of the signal strength values for the original landmark and the candidate landmark. The estimated physical location of the landmark may also be adjusted based on the estimated physical location of the candidate landmark e.g., the x-y coordinates for the landmark and original landmark may be averaged. FIG. 12B, for example, illustrates the new landmark 1210, which is between the locations for the original landmark 1170 and the candidate landmark 1205.

Although the simplified example in FIG. 12 shows only a single candidate landmark, in various embodiments, the server 110 obtains multiple sets of trajectory data (possibly from multiple devices) and determines the locations of multiple candidate landmarks. That is, the server performs steps 230 and 235 multiple times. The server 110 then compares the landmark to each of the candidate landmarks (i.e., step 240) and selects those candidate landmarks that are sufficiently similar (step 245). The location of the landmark is then adjusted based on the selected candidate landmarks using any suitable technique. By way of example, the the landmark and the selected candidate landmarks may be clustered using any clustering algorithm. The location/fingerprint data for the adjusted landmark may be based on a centroid for the cluster.

The adjustment of the location, fingerprint data or other characteristics of the landmark may involve adding data or making adjustments to the map e.g., as discussed in connection with step 225. Once the location/characteristics for the landmark in the map are adjusted, the method 200 returns to step 205 and/or step 230. That is, the server 110 then collects additional trajectory data. In various embodiments, the trajectory data may be used to determine the location of new landmarks, which can be added to or associated with the map (e.g., steps 205-225.) Alternatively or additionally, the location/characteristics for existing landmarks in the map may be adjusted based on new trajectory data (e.g., steps 230-255.)

The adjustment or addition of landmarks in the map, as described in connection with method 200 of FIG. 2, can also be used to determine other characteristics of the map. In some embodiments, for example, once the location of a new landmark has been determined and/or once a new landmark has been added to the map (e.g., step 220 and 225), the server 110 adjusts passages, corridors, hallway structures or other structures based on the new landmark. Put another way, when a new landmark has been determined and/or added, the server 110 determines one or more constraints, which help indicate a shape or characteristic of a hallway or pathway layout. For example, if a landmark is known to be a room or shop that takes up a particular space in the map, then the server may adjust the pathway layout, hallways, corridors and/or paths accordingly so that they do not cross into or incorporate the space.

Maps that are adjusted as discussed in method 200 of FIGS. 2A-2B can be used in a wide variety of applications. In some approaches, for example, the map is used to localize a user with a device 104 (e.g., a mobile device, smartphone, tablet, etc.) That is, a user who visits an area represented by the map (e.g., map 400 of FIG. 4) can use the device 104 to determine his or her location. The location may be determined using trajectory data collected by the device. The device 104 uploads the trajectory data to the server 110. In various implementations, the server 110 uses the locations of the landmarks in the map and the received data to help determine the location of the user and the device within the map. The server 110 then transmits the data indicating the location of the user in the map and/or the relative location of the landmarks back to the device 104. The device 104 may then display information based on the transmitted data. In some implementations, the device 104 uses the transmitted data to display guidance information that directs a user to a desired destination within the map/area. Alternatively or additionally, the device 104 uses the transmitted data to guide the user on a trip through the map/area that involves visiting one or multiple landmarks, which are indicated on the map and whose locations were determined using method 200 of FIGS. 2A-2B.

In another application, the server 110 may track the real time movements of users, as described above. In particular, the server 110 uses the obtained trajectory data to determine traffic patterns in the map. By way of example, the server 110 may determine how frequently users are visiting and/or passing by particular landmarks. In still other embodiments, the server 110 determines how long one or more users are spending at a particular landmark. Based on these determinations, the server 110 generates recommendations (e.g., the quickest route to a particular landmark, the most popular shops that are worth visiting, etc.) The server 110 then transmits the recommendation to one or more devices for display at those devices.

The steps of method 200 of FIGS. 2A-2B may be performed without adjusting the pathway layout. That is, in various embodiments, it is desirable to use the method 200 of FIGS. 2A-2B to adjust characteristics (e.g., ambient signal fingerprint data, location, etc.) of a landmark in the map or to add a new landmark to the map (e.g., using step 220 and 225), but to otherwise keep other characteristics of the map the same. In some approaches, when the server 110 determines the location of the landmark in the map (e.g., step 220), no changes are made to the pathway layout in the map. In this context and in various embodiments, the pathway layout refers to some or all parts of the map that indicate (generally straight) paths (e.g., corridors, hallways, routes, etc.) between intersections (i.e., points where two or more paths meet.) In various implementations, the pathway layout of the map remains the same and is not changed based on the matching operation of step 215, the trajectory data obtained in step 205 and/or step 230, and/or any other steps of method 200. More specifically, the locations of paths, intersections and/or segments (e.g., as discussed in the context of map 400 of FIG. 4) in the map are not adjusted based on the aforementioned operations/steps.

Put another way, various implementations of the method 200 of claims 2A and 2B can be seen as an incremental process. That is, landmark locations in the map are determined and/or landmarks are added to the map by repeating method 200. Thus, in various implementations, landmarks may adjust their positions in the map somewhat, or new landmarks may be added, but the locations of the nodes, segments, pathway layout, corridors, hallways, paths between corners/intersections and/or their associated parameters (e.g., ambient signal fingerprint data) do not change. At some point, it may be possible that these characteristics may be updated as well e.g., the fingerprint data or arrangement of the paths may be adjusted. If that is the case, the method 200 can be repeated using new trajectory data to add landmarks to the adjusted map and pathway layout/paths.

Figure 13:
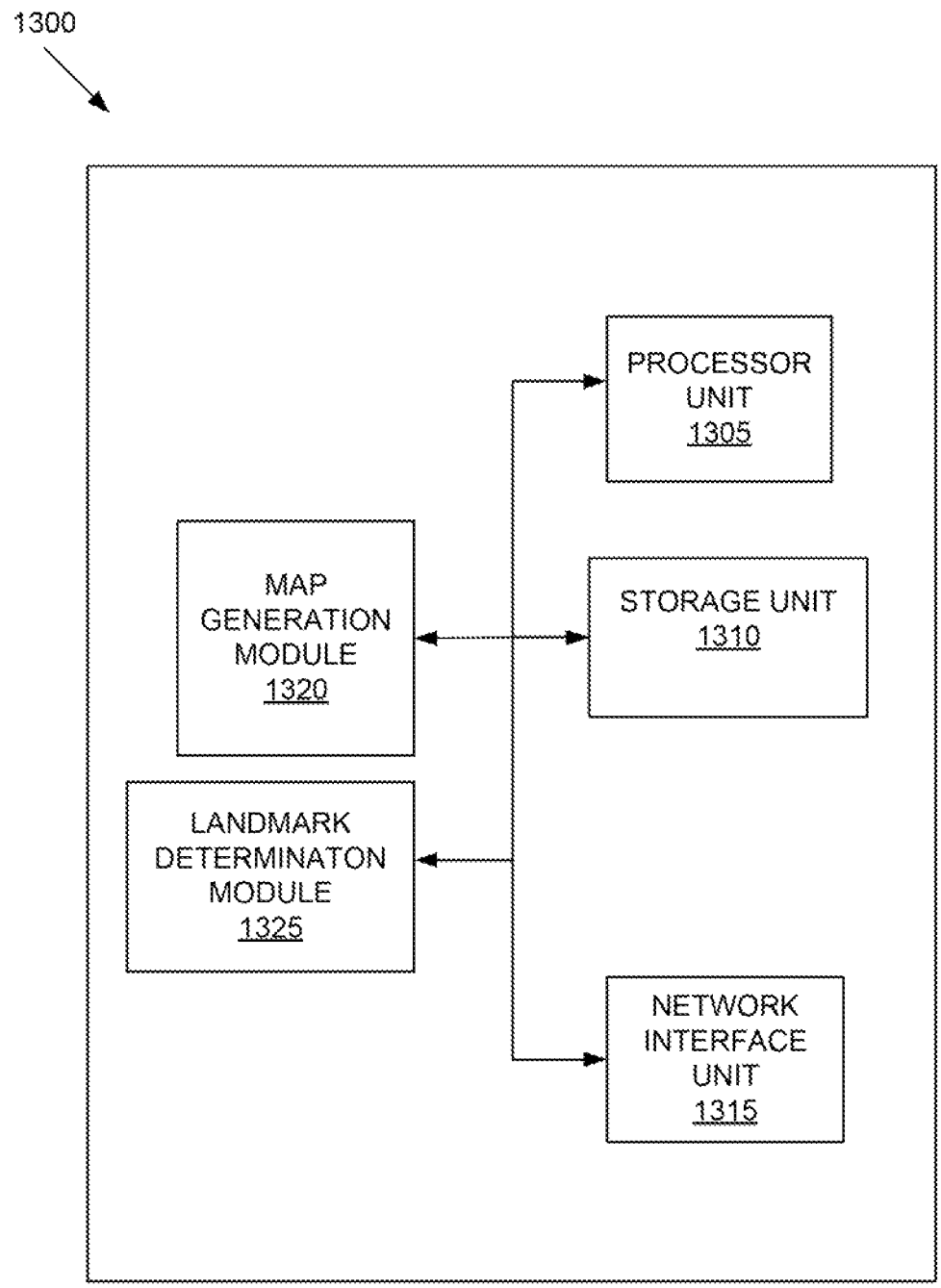
FIG. 13 is a block diagram of a server according to a particular embodiment of the present invention.

Referring next to FIG. 13, a server 1300 according to a particular embodiment of the present invention will be described. The server 1300, which may be the server 110 of FIG. 1 or any other server described herein, includes a processor unit 1005 having one or more processors, a storage unit 1310, a network interface unit 1315, a map generation module 1320, and a landmark determination module 1325. The server 1300 may be any computing device suitable for processing and analyzing trajectory data and/or determining the location of a landmark in a map.

The storage unit 1310 is any hardware or software suitable for storing data or executable computer code. The storage unit 1310 can include but is not limited to a hard drive, flash drive, non-volatile memory, volatile memory or any other type of computer readable storage medium. Any operation or method for the server that is described in this application (e.g., FIGS. 2A-2B, 6, 8 and 10) may be stored in the form of executable computer code or instructions in the storage unit 1310. The execution of the computer code or instructions by the processor unit 1305 causes the server 1300 or a suitable device coupled with the server 1300 to perform any of the aforementioned operations or methods.

The network interface unit 1315 includes any hardware or software suitable for enabling the server 1300 to communicate with external devices. In various embodiments, for example, the server 1300 receives trajectory data from one or more devices 104 through a network 108 using the network interface unit 1315 (e.g., as discussed in step 205 of FIG. 2A.) The server 1300 may also obtain a map from an external device or another server through the network interface unit 1315 (e.g., as discussed in step 210 of FIG. 2A). Once the server 1300 has determined the location of a landmark in a map (e.g., step 220 of FIG. 2A), in various implementations the network interface unit 1315 is arranged to transmit data indicating the location and/or the map to one or more devices 104, so that the users of those devices can view or otherwise use the information. The network interface unit 1315 is arranged to transmit data and receive data using any suitable network (e.g., LAN, Internet, etc.) or communications protocol (e.g., Bluetooth, WiFi, NFC, IEEE 802.15.4, IEEE 802.11, etc.)

The map generation module 1320 is any hardware or software that is used to perform operations related to the obtaining and/or generation of a map (e.g., as described in connection with step 210 of FIG. 2A.) In some embodiments, the map generation module 1320 is arranged to use trajectory data received from one or more devices 104 to generate a map. In some implementations, only trajectory data that does not indicate the location of a landmark is used to generate the map, at least initially. Thus, the map generation module 1320 is arranged to select trajectory data that meet this criteria, and uses only the selected trajectory data to generate the map. In other embodiments, however, various types of trajectory data, including those with landmark data, are used to generate the map. The map generation module 1320 is arranged to generate the map using any technique or sources described in this application (e.g., step 210 of FIG. 2A). In some implementations, the map generation module 1320 is arranged to generate a vector map and/or a map data structure with nodes and segments (e.g., map 400 of FIG. 4.) Alternatively or additionally, the map generation module 1320 is arranged to generate the map based on a raster/bitmap image of a map.

The landmark determination module 1325 is any hardware or software that is used to perform operations related to the determination of the location of one or more landmarks in a map. The landmark determination module is arranged to perform any of the operations described in the methods of FIGS. 2A-2B, 6, 8 and 10. By way of example, the landmark determination module 1325 is arranged to determine a location of a landmark based on trajectory data received from a device; match at least portions of the trajectory data to at least portions of the map; and based on the matching, determine the location of the landmark. Additionally, the module is arranged to adjust the location of the landmark based on additional trajectory data (e.g., as discussed in connection with steps 230-255 of FIGS. 2A and 2B.)

Figure 14:
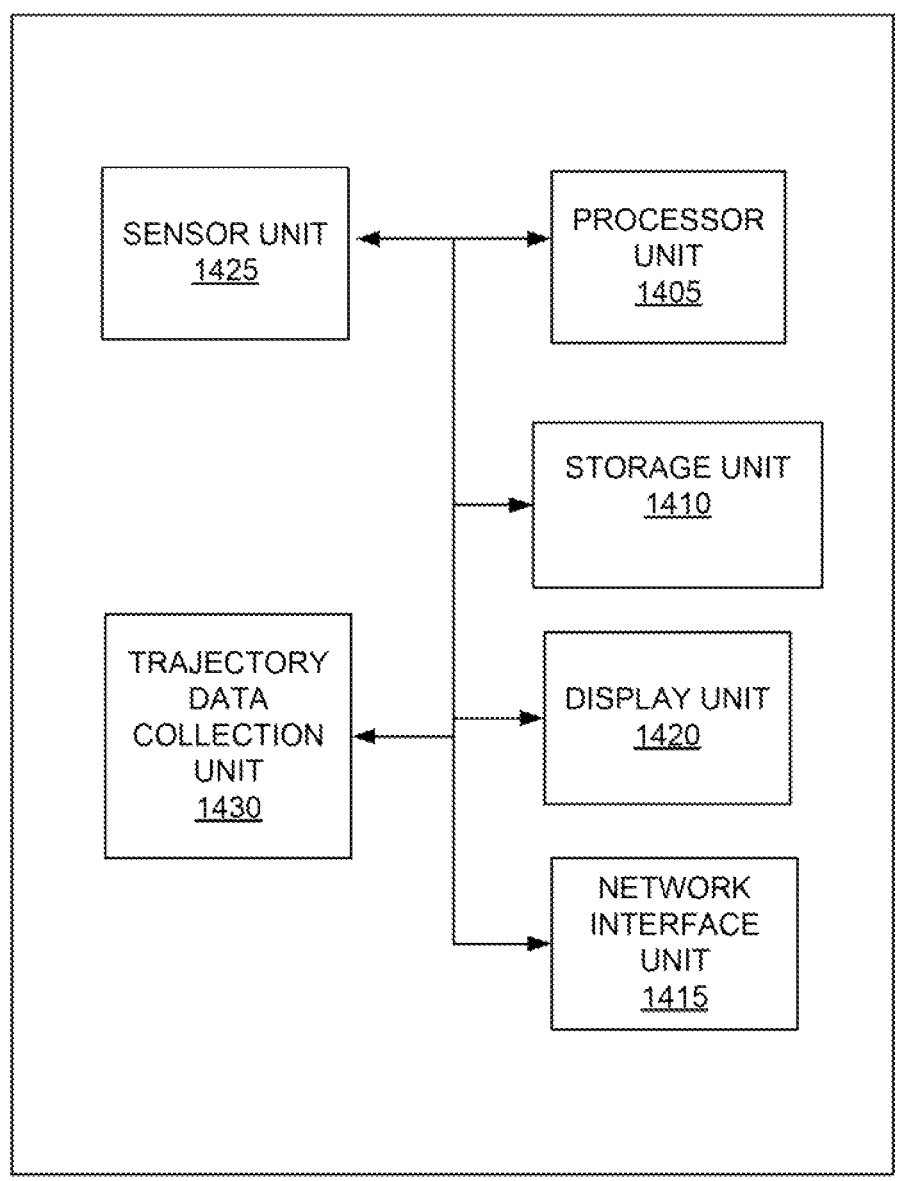
FIG. 14 is a block diagram of a device according to a particular embodiment of the present invention.

Referring next to FIG. 14, a device 1400 according to a particular embodiment of the present invention will be described. The device 1400, which may be the device 104 of FIG. 1, includes a processor unit 1405 having one or more processors, a storage unit 1410, a display unit 1420, a network interface unit 1415, a sensor unit 1425 and a trajectory data collection unit 1430. The device may be any computing device arranged to communicate with the server 110 and obtain trajectory data. In various embodiments, the device 1400 is a mobile device, a cell phone, a laptop, a computer tablet, smart glasses, a smart watch or any other suitable computing device.

The storage unit 1410 is any hardware or software suitable for storing data or executable computer code. The storage unit 1010 can include but is not limited to a hard drive, flash drive, non-volatile memory, volatile memory or any other type of computer readable storage medium. Any operation or method that may be performed by the device (e.g., method 200, steps 205 and/or 210 of FIGS. 2A-2B) may be stored in the form of executable computer code or instructions in the storage unit 1010. The execution of the computer code or instructions by the processor unit 1005 causes the device 1400 to perform any of the aforementioned operations or methods.

The network interface unit 1415 includes any hardware or software suitable for enabling the device 1400 to communicate with external devices. In various embodiments, for example, the device 1400 obtains trajectory data and the network interface unit 1415 is arranged to transmit the trajectory data to the server 110 over the network (e.g., as discussed in steps 205-215 of FIG. 2A.) The network interface unit 1415 is also arranged to receive map- and landmark-related information from the server 110. The network interface unit 1415 is arranged to transmit data and receive data using any suitable network (e.g., LAN, Internet, etc.) or communications protocol (e.g., Bluetooth, WiFi, NFC, IEEE 802.15.4, IEEE 802.11, etc.)

The display unit 1420 includes any hardware of software suitable for displaying information at the device. The display unit 1420 may include any display technology e.g., a touch sensitive (capacitive) screen, an e-ink display, an LCD or OLED display or any other suitable display technology. In some embodiments, the device 1400 receives map and landmark information from the server 110. (The server 110 determines this information as discussed, for example, in steps 205-225 of FIG. 2A). The display unit 1415 is arranged to display information, imagery, maps, routes and/or guidance information based on the received information.

The sensor unit 1425 includes any sensor(s), hardware or software suitable for detecting and measuring ambient signals or other environmental parameters. Such sensors may include but are not limited to one or more antennae arranged to receive an RF signal (e.g., WiFi, Bluetooth, etc.), a light sensor, a motion sensor, an accelerometer, a gyroscope, a sensor for detecting any ambient signal, etc. In various embodiments, the device 1400 uses data obtained by the sensor unit 1425 to obtain trajectory data e.g., as discussed in connection with step 205 of FIG. 2A.

The trajectory data collection unit 1430 is any software or hardware that is arranged to obtain trajectory data. In some embodiments, the trajectory data collection unit is arranged to use the sensor unit 1425 to collect trajectory data, as described in step 205 of FIG. 2A and FIG. 3.

This application refers to matching trajectory data with a map. It should be appreciated that such matching may be performed in a wide variety of ways, using any known technique, any technique described herein and/or any technique described in the aforementioned co-assigned patent applications. In various embodiments, this phrase means that at least a portion of the trajectory data is compared to at least a portion of the map. The comparison may take many forms. In some implementations, the comparison involves a spatial or graphical comparison. For example, in some embodiments, the trajectory data indicates a physical path or pathway layout. This shape and/or contours of this path is compared to the shape and/or contours of a physical path that is indicated by the map. If the shape and/or contours of the path (or parts thereof) are found to be sufficiently similar, then a match is found.

Additionally or alternatively, the comparison can involve a data comparison. For example, the trajectory data may include multiple points (e.g., as discussed in connection with trajectory data 300 of FIG. 3.) Each point represents a physical location. Each point also includes ambient signal fingerprint data that was obtained by a device when the device was at that physical location. The map data may include or indicate multiple points with the same or similar characteristics (e.g., as discussed in connection with map 400 of FIG. 4) Thus, in various implementations the matching involves comparing the ambient signal fingerprint data of various points in the trajectory data with the ambient signal fingerprint data of various points in the map. If a sufficient number of points are sufficiently similar (e.g., the calculated Tanimoto similarity exceeds a particular threshold) then a match is found.

The matching can also involve aspects of both a spatial and a data-based comparison. To use a simple example, in the trajectory data, there may be a line of points that represents sequential, consecutive movements of a device, as indicated by the timestamps associated with those points. The points indicate a particular spatial path/shape e.g., a straight line or a curve. This line of points is compared to another line of points indicated in the map data, which also indicate sequential locations and/or a particular spatial path. A match may be found if the following criteria are met: (1) the lines of points in the trajectory data and map appear to correspond to the same physical locations; (2) the lines of points in the trajectory data and the map appear to indicate the same shape, distances and/or proportions e.g., a curve in a corridor, a straightline hallway etc.; (3) the ambient signal fingerprint data associated with each point in the line in the trajectory data is found to be sufficiently similar to the ambient signal fingerprint data associated with the corresponding point in the map. In some implementations, a match may be found even if one or more of the above criteria are not satisfied, or if a particular criteria is partially but not fully satisfied. The above criteria should be understood only as exemplary and non-limiting, and the matching process may be performed using any suitable technique.

This application also sometimes refers to the determination of a distance between points and clustering. Any of these operations may be performed using any known technique, or any technique described in the aforementioned co-assigned patent applications.

Although only a few embodiments of the invention have been described in detail, it should be appreciated that the invention may be implemented in many other forms without departing from the spirit or scope of the invention. For example, the present application and figures describe various methods that perform particular operations. It should be appreciated that in some embodiments, one or more of these operations/steps may be modified, reordered and/or deleted. Additionally, some figures, such as FIGS. 1, 13 and 14, describe devices/systems that contain various components. It should be noted that in some embodiments, one or more of these components may be merged together. In still other embodiments, one or more components may be separated into a greater number of components. The features of one component may be transferred to another and/or modified as appropriate. Each device may have additional components beyond what is shown in the corresponding figure. Particular modules or devices that are shown as being part of a particular object may instead be coupled with the object e.g., with a wired or wireless connection. For example, in various implementations, all or almost all of the operations described in method 200 of FIGS. 2A-2B are performed by a server (e.g., server 110.) However, in still other embodiments, any of these operations may be performed by the device 104, or another system or device that is coupled with the server. Therefore, the present embodiments should be considered illustrative and not restrictive and the invention is not to be limited to the details given herein.

What is claimed is:

1. A method performed by a server, comprising:
    obtaining a first trajectory data indicating movement of a device at an area, the first trajectory data indicating a first landmark;
    selecting a portion of the first trajectory data, the portion being less than an entirety of the first trajectory data;
    selecting one or more segments from the portion of the first trajectory data, wherein the one or more segments from the portion of the first trajectory data are adjacent to the first landmark;
    obtaining a map of the area, the map indicating a pathway layout defined by the one or more segments from the portion of the first trajectory data;
    matching at least the portion of the first trajectory data with at least a portion of the pathway layout; and
    based on the matching, determining a location of the first landmark in the map.

2. The method performed by the server of claim 1, further comprising:
    obtaining a second trajectory data indicating a second landmark;
    comparing the first and second landmarks based on distance and ambient signal fingerprint data of the first trajectory data and the second trajectory data respectively; and
    based on the comparison, adjusting the location of the first landmark in the map.

3. The method performed by the server of claim 1, wherein a landmark is one of a point on the map and an area on the map.

4. The method performed by the server of claim 1, wherein the first landmark is one of a door, stairs, a shop and an elevator.

5. The method performed by the server of claim 1, further comprising:
    identifying a portion of the first trajectory data indicating that the device changed direction beyond a predefined frequency threshold or moved at a speed that fell below a predefined speed threshold; and
    determining that the identified portion of the first trajectory data corresponds to the first landmark.

6. The method performed by the server of claim 1, wherein the map is a first map and the first map does not indicate any landmarks prior to the matching and wherein after the matching the first landmark is added to the first map to form a second map.

7. The method performed by the server of claim 1, wherein the pathway layout is a part of the map that indicates locations of paths and intersections and the pathway layout is not adjusted based on the matching.

8. The method performed by the server of claim 1, further comprising: matching the one or more segments with at least a portion of the pathway layout.

9. The method performed by the server of claim 1, wherein:
    the first trajectory data includes a first sequence of points that extends from a start point of the first trajectory data to a start point of the first landmark and a second sequence of points that extends from an end point of the first trajectory data to an end point of the first landmark; and
    matching the first sequence of points and second sequence of points with at least a portion of the pathway layout.

10. The method performed by the server of claim 1, wherein obtaining the map of the area further comprises:
    obtaining a multiplicity of sets of trajectory data from one or more devices, each set of trajectory data indicating movement of a device at the area;
    determining, for each set of trajectory data, whether the set of trajectory data includes a landmark;
    based on the determination, selecting one or more of the sets of trajectory data that do not include the landmark; and
    using the selected one or more sets of trajectory data to help form the map.

11. The method performed by the server of claim 1, wherein the first trajectory data includes a plurality of points, each point being associated with a timestamp and ambient signal fingerprint data.

12. The method performed by the server of claim 1, wherein the first landmark is a room.

13. A non-transitory computer readable medium including a plurality of instructions that, when executed by a processor, are configured to cause the processor to:
    obtain a first trajectory data indicating movement of a device at an area, the first trajectory data indicating a first landmark;

select a portion of the first trajectory data, the portion being less than an entirety of the first trajectory data;
select one or more segments from the portion of the first trajectory data, wherein the one or more segments from the portion of the first trajectory data are adjacent to the first landmark;
obtain a map of the area, the map indicating a pathway layout defined by the one or more segments from the portion of the first trajectory data;
match at least the portion of the first trajectory data with at least a portion of the pathway layout; and
determine, based on the matching, a location of the first landmark in the map without changing the pathway layout.

14. The non-transitory computer readable medium of claim 13, wherein the plurality of instructions is further configured to cause the processor to:
obtain a second trajectory data indicating a second landmark;
compare the first and second landmarks based on distance and ambient signal fingerprint data of the first trajectory data and the second trajectory data respectively; and
adjust, based on the comparison, the location of the first landmark in the map.

15. The non-transitory computer readable medium of claim 13, wherein the plurality of instructions is further configured to cause the processor to:
identify a portion of the first trajectory data indicating that the device changed direction beyond a predefined frequency or moved at a speed that fell below a predefined speed; and
determine that the identified portion of the first trajectory data indicates the first landmark.

16. The non-transitory computer readable medium of claim 13, wherein the plurality of instructions is further configured to cause the processor to:
match the one or more segments with at least a portion of the pathway layout.

17. The non-transitory computer readable medium of claim 13, wherein the first trajectory data includes a first sequence of points that extends from a start point of the first trajectory data to a start point of the first landmark and a second sequence of points that extends from an end point of the first trajectory data to an end point of the first landmark wherein the plurality of instructions of the non-transitory computer readable medium is further configured to cause the processor to match the first sequence of points and second sequence of points with at least a portion of the pathway layout.

18. A device comprising:
at least one processor; and at least one memory circuitry, the at least one memory circuitry including a non-transitory computer readable medium, including a plurality of instructions that, when executed by the at least one processor, causes the device to:
obtain a first trajectory data indicating movement of the device at an area, the first trajectory data indicating a first landmark,
select a portion of the first trajectory data, the portion being less than an entirety of the first trajectory data,
the portion of the first trajectory data, wherein one or more segments from the portion of the first trajectory data are adjacent to the first landmark,
obtain a map of the area, the map indicating a pathway layout defined by the one or more-segments from the portion of the first trajectory data,
match at least the portion of the first trajectory data with at least a portion of the pathway layout, and
determine, based on the matching, a location of the first landmark in the map without changing the pathway layout.

19. The device of claim 18, wherein the plurality of instructions is further configured to cause the at least one processor to:
obtain a second trajectory data indicating a second landmark;
compare the first and second landmarks based on distance and ambient signal fingerprint data of the first trajectory data and the second trajectory data respectively; and
adjust, based on the comparison, the location of the first landmark in the map.

20. The device of claim 18, wherein the plurality of instructions is further configured to cause the at least one processor to: match the one or more segments with at least a portion of the pathway layout.

21. The device of claim 18, wherein:
the first trajectory data includes a first sequence of points that extends from a start point of the first trajectory data to a start point of the first landmark and a second sequence of points that extends from an end point of the first trajectory data to an end point of the first landmark wherein the plurality of instructions is further configured to cause the at least one processor to match the first sequence of points and second sequence of points.

* * * * *